United States Patent [19]

Sarr

[11] Patent Number: 5,283,642
[45] Date of Patent: Feb. 1, 1994

[54] SCRATCH MEASUREMENT APPARATUS AND METHOD

[75] Inventor: Dennis P. Sarr, Kent, Wash.

[73] Assignee: The Boeing Company, Seattle, Wash.

[21] Appl. No.: 852,027

[22] Filed: Mar. 16, 1992

[51] Int. Cl.⁵ ............................................. H04N 7/18
[52] U.S. Cl. ...................... 348/135; 73/105; 356/237; 348/128
[58] Field of Search ............... 358/101, 106, 107, 93; 73/105; 356/237; H04N 7/18

[56] References Cited

U.S. PATENT DOCUMENTS

| | | | |
|---|---|---|---|
| 4,305,661 | 12/1981 | Pryor et al. | 356/241 |
| 4,394,683 | 7/1983 | Liptay-Wagner et al. | 358/107 |
| 4,629,319 | 12/1986 | Clarke et al. | 356/237 |
| 4,825,394 | 4/1989 | Beamish et al. | 364/571.01 |
| 4,853,777 | 8/1989 | Hupp | 73/105 |
| 4,878,114 | 10/1989 | Huynh | 358/101 |

FOREIGN PATENT DOCUMENTS

| | | |
|---|---|---|
| 2803219 | 7/1978 | Fed. Rep. of Germany . |
| 53-72679 | 2/1978 | Japan . |
| 61-264207 | 6/1986 | Japan . |
| 63-61149 | 9/1988 | Japan . |
| 63-241406 | 10/1988 | Japan . |

OTHER PUBLICATIONS

IBM Technical Disclosure Bulletin, *Wafer Surface Scratch Detector* by A. Dupnock, D. Piscitelli and A. Tong, Sep. 1970.

"Machine Vision Optics Guide", No. 500, Newport Corporation Publication date unknown, pp. 6-8.

"A Perspective on Range Finding Techniques for Computer Vision" by R. A. Jarvis, *IEEE Transactions on Pattern Analysis and Machine Intelligence,* Mar. 1983, pp. 122-139.

"Optical Three-Dimensional Sensing for Machine Vision" by T. C. Strand, *Optical Engineering,* Jan./Feb. 1985, pp. 33-40.

*Primary Examiner*—Howard W. Britton
*Attorney, Agent, or Firm*—Dellett and Walters

[57] ABSTRACT

A scratch measurement system employs a class I or class II laser and digital signal processing in conjunction with a vision system to measure scratch depth. Video data acquired by a vision system is processed to determine threshold values wherein the scratch surface is detected and scratch depth computed. Hard copy graphic results as well as numerical scratch depth measurements are provided on a printer. The unit may be calibrated to a certifiable standard and is provided in a low-cost portable package, suitable for use in manufacturing and repair situations as well as in the laboratory.

41 Claims, 22 Drawing Sheets

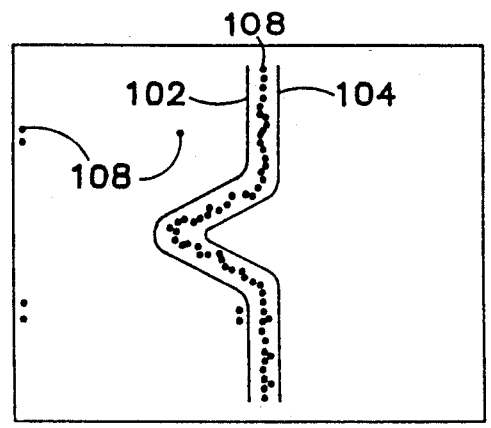
FIG. 8
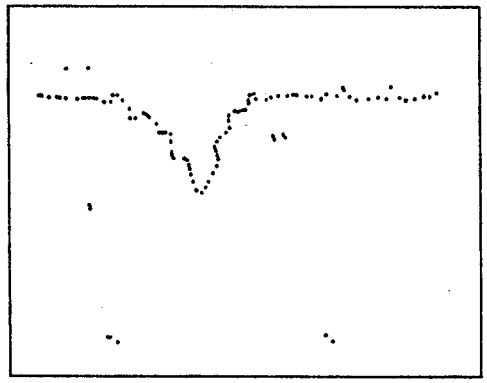 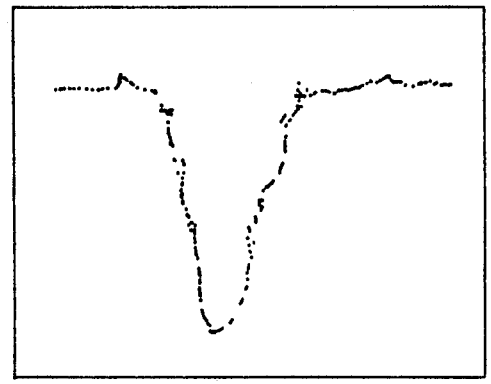
FIG. 9   FIG. 10
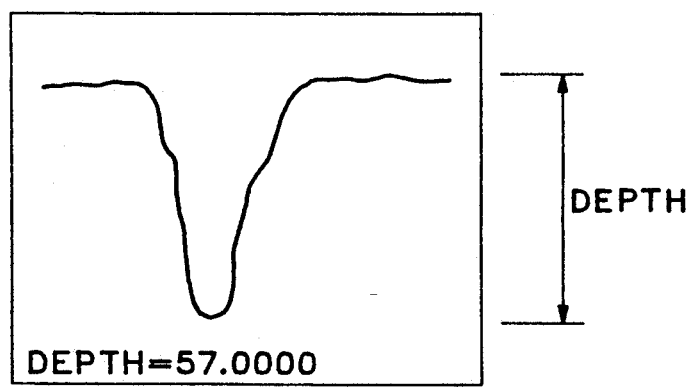
FIG. 11

SCRATCH MEASUREMENT APPARATUS AND METHOD

BACKGROUND OF THE INVENTION

The present invention pertains to a scratch measuring method and apparatus and more particularly to a portable scratch measurement system which provides a visual display of a scratch together with information regarding scratch depth.

There are many situations where it is desirable to measure the depth of the scratch on a surface. For example, in airplane surfaces scratches can cause structural problems, or, in the case of a stealth-type aircraft, scratches in the surface coating may reduce the stealth effectiveness, when the scratches extend beyond a certain depth. Various methods have been employed heretofore to measure scratch depth. For instance, chemical methods have been employed, but are undesirable in that they can be disorderly and dangerous, employing hazardous materials which give rise to safety and environmental concerns. Further, the chemical processes typically affect areas adjacent the scratched portion. Eddy current testing is an alternative but is unsuitable when the surfaces are formed of non-metal or composite materials. Ultrasound typically requires that sensors be placed on the opposite side of the surface containing the scratch and this method may therefore be impractical. Moreover, reflected ultrasound is often not effective because a rough scratch bottom will provide inconsistent readings.

Optical microscopes have been utilized in the past to view the extent of a scratch, but the equipment can be bulky and difficult to operate, especially in locations requiring an operator to assume an awkward position underneath a plane fuselage. Furthermore, measurement is subjective, based upon the operator's interpretation of the view provided. Mechanical probes are undesirable for scratch measurement inasmuch as the probe can become embedded in the surface, worsening the scratch by increased penetration. Further, the radius of the probe tip may be larger than the scratch width and hence not reach the bottom of the scratch. Other mechanical methods include the use of replication putty together with an optical comparator. Such a method is labor-intensive and the putty may not form into the crack, or may remain behind in the crack and complicate repair. Some radiographic methods are theoretically possible, but it may not be feasible to position a sensor on a back surface of a scratched area. Also, backscatter methods of radiographic testing are expensive.

SUMMARY OF THE INVENTION

In accordance with a first embodiment of the present invention a scratch measuring device is provided in a portable apparatus which employs a sensor including a laser generating a line of laser light illuminating the scratch. A video camera employing a magnification lens is positioned at an angle relative to the projection plane of the line of the light. The video image from the camera is supplied to a video signal processor which determines the scratch contour based on the gray level of the video image. This data is then filtered and the results thereof are employed to compute scratch depth. A graphic display of the scratch shape is generated and may be printed along with the calibrated depth of the scratch.

A second embodiment of the invention employs the above-described sensor as a rivet head height measurement device, wherein the video image is processed to filter out depth aberrations adjacent the rivet.

It is accordingly an object of the present invention to provide an improved scratch measurement method and apparatus.

It is another object of the present invention to provide an improved scratch measurement apparatus which is portable and which may be employed in manufacturing as well as field operations.

It is another object of the present invention to provide an improved low-cost and easy to use scratch measurement device.

It is yet another object of the present invention to provide an improved non-destructive scratch measurement device for quantifying scratch depth in a variety of surfaces and providing real time results.

It is another object of the present invention to provide an improved scratch measurement device capable of being certified to a calibration standard.

It is a related object of the present invention to provide an improved system for precisely measuring the height of one surface relative to another surface.

It is another object of the invention to provide an improved measurement system for determining the flushness of a fastener relative to a fastened surface.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 8 is a graph comparing the original image with the real digital data acquired by the present invention;

FIG. 9 illustrates a display of data acquired by the present invention with no filtering performed;

FIG. 10 illustrates a display of data acquired by the present invention with analysis performed thereon;

FIG. 11 is a representation of the data display indicating scratch depth;

DETAILED DESCRIPTION

Figure 1:
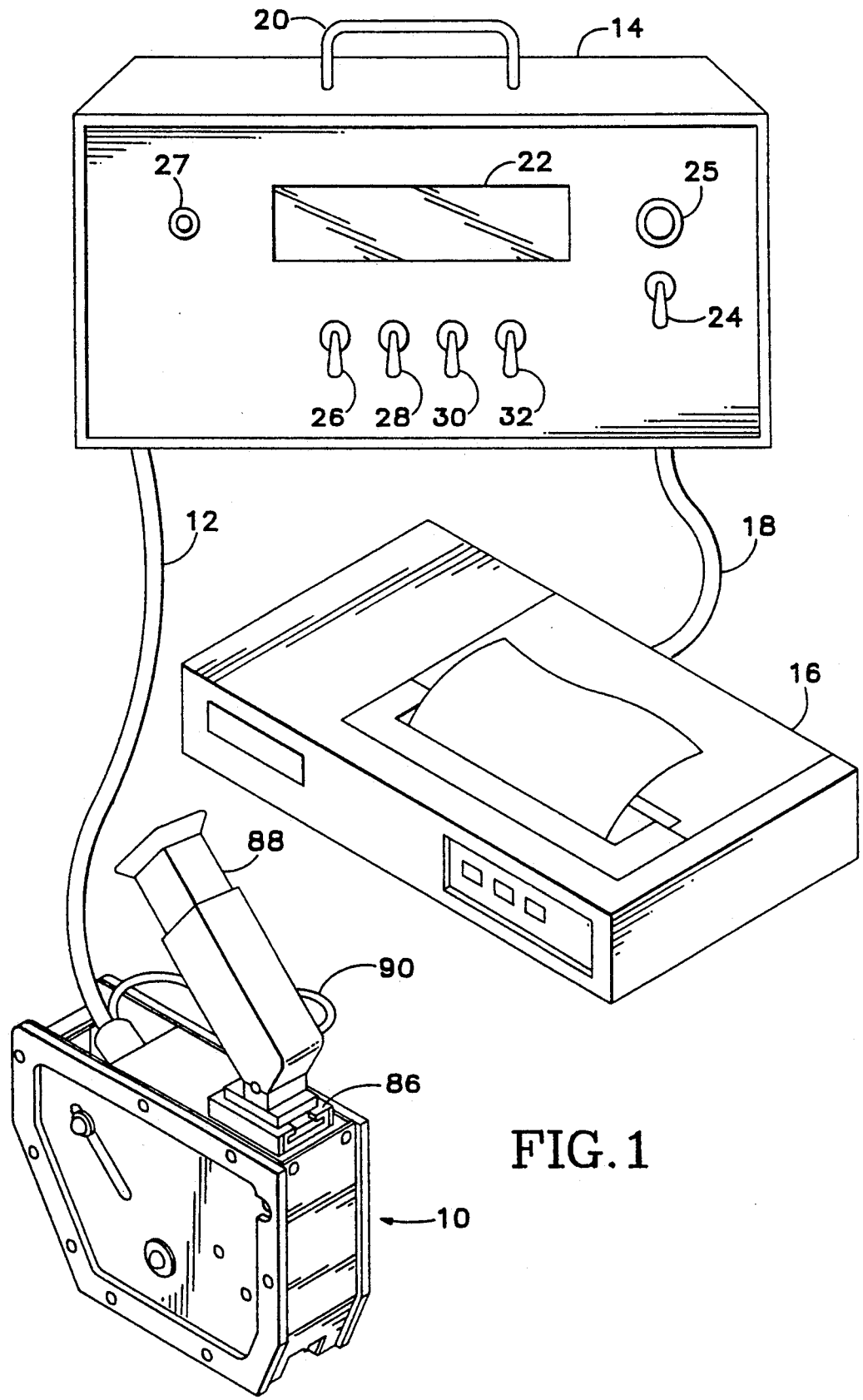
FIG. 1 is a perspective view of the scratch measurement system according to the present invention.

Referring now to FIG. 1, an overall perspective view of a scratch measurement system in accordance with the present invention, scratch measurement probe 10, contains image generation and capture components as will be described herein, and is adapted to be placed on a scratched surface. The probe is connected via cable 12 to measurement display/electronics unit 14 and carries viewfinder 88 removably mounted thereon via mounting shoe 86 for allowing an operator to view a scratch of interest and to assist in correctly positioning the probe over the scratch. The viewfinder suitably comprises a video viewer of the type employed with a camcorder, being supplied with video data via cable 90 (an extension of cable 12) from the main body of the probe. The cable 90 may also be a separate cable from unit 14. Also provided is a printer 16 (or other suitable report generating device) receiving data from unit 14 via printer cable 18 for the purpose of generating hard copy reports of scratch measurement information, supplying both graphic and numeric representations of the measured scratch (described herein with reference to FIG. 12). While the illustrated printer is external to the unit 14, an internal printer may also be employed.

Display/electronics unit 14 includes a handle 20 for ease of transport to and from the measurement site, and a display 22, which in the preferred embodiment comprises a liquid crystal display supplying both graphic and textual information about a particular measurement. The unit 14 includes ON-OFF switch 24 for activating and deactivating the unit, and a power indicator 25, comprising, for example, a light-emitting diode or other suitable light-producing device. A reset switch 27 initializes the unit when depressed.

Also provided on the front panel of the data collection unit 14 is analysis switch 26, comprising a toggle switch in the illustrated embodiment for enabling or disabling certain analysis of the data collected by probe 10. The analysis is described herein in conjunction with FIGS. 15A through 15B. Adjacent analysis switch 26 is another toggle switch, filter switch 28 which serves to enable or disable filtering of the data gathered. In the preferred embodiment, the filter comprises a low-pass filter and the steps performed when the filter switch is in the enable position are described herein with reference to FIG. 16. The data collection unit also includes a calibration switch 30 adapting the unit to perform certain calibration steps. Adjacent the calibration switch is a second calibration switch 32 having HIGH and LOW positions for indicating whether a high calibration standard or a low calibration standard is currently being employed. The calibration steps are described in greater detail in connection with FIGS. 17A through 17B.

Figure 2:
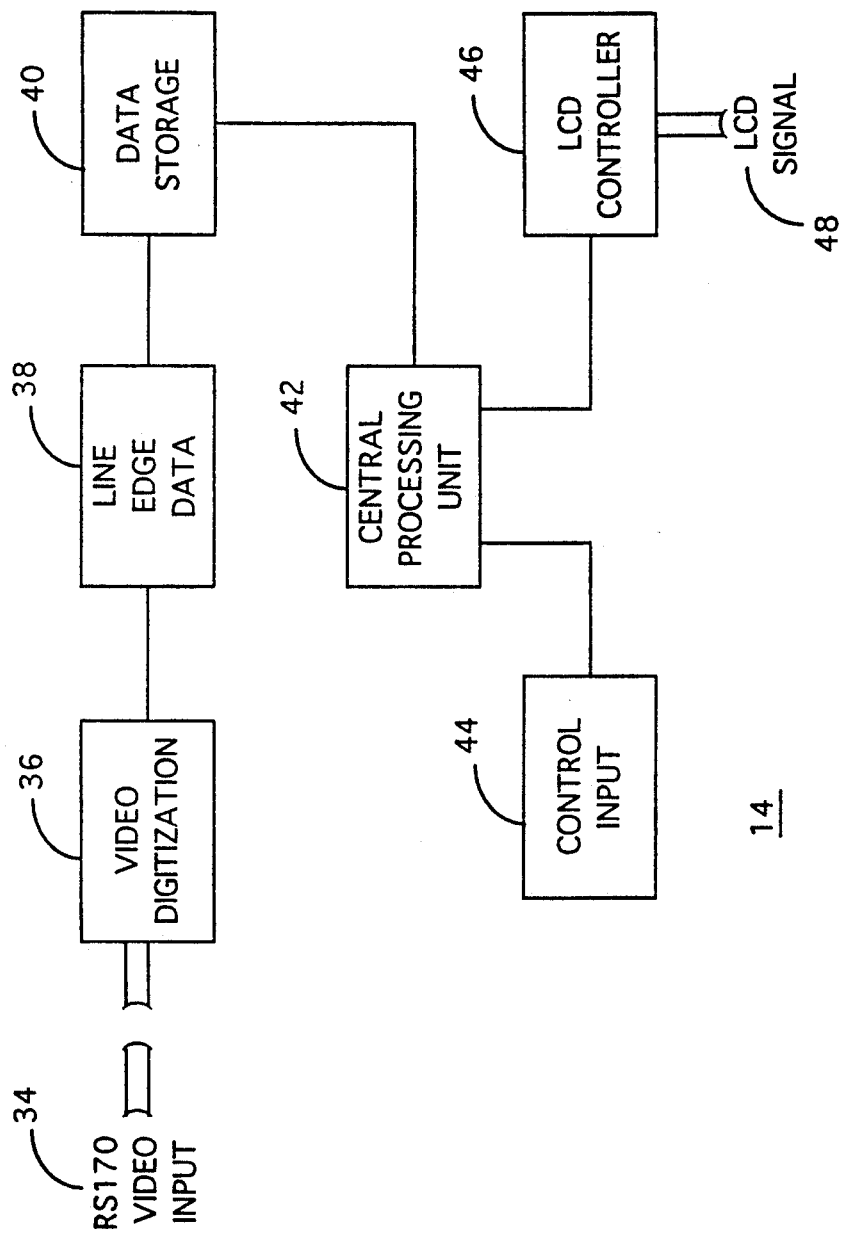
FIG. 2 is a block diagram of the electronic system according to the present invention.

Referring now to FIG. 2, a block diagram of the electronic system of unit 14, the unit receives a video input signal 34 from sensor 10 of FIG. 1 and this video input is supplied to video digitization block 36 for converting the analog video signal into a digital form. The digital data generated by block 36 is then transferred to line edge data generation block 38 where it is determined where the edge of the line viewed by the probe 10 (i.e., the scratch edge) is located. The generation of this line data is discussed in greater detail in conjunction with FIG. 6 hereinbelow. Having generated the line edge data, unit 14 stores the information in data storage 40, in the illustrated embodiment, comprising FIFO data storage chips which store and retrieve data on a first-in/first-out basis. In the preferred embodiment, this data storage comprises FIFO chips Nos. IDT720-2LA50P, manufactured by Integrated Device Technology of Santa Clara, Calif.

The line edge data as contained in the data storage 40 is next supplied to central processing unit 42 performing the various filtering, analysis and depth computation steps, as will be described. In the preferred embodiment, the central processing unit comprises an 8085 central processing unit, but any suitable processing unit may be employed. The operations of the central processing unit are governed by control input block 44 which includes RAM and ROM containing control programs for directing operation of the CPU. The control programs run by the central processing unit in conjunction with control input 44 are described with reference to FIGS. 13A through 13D hereinbelow. Information from the data storage 40 as processed by CPU 42 as well as data generated by CPU 42 are sent to LCD controller 46 and an LCD signal 48 is produced which is supplied to the display 22 of FIG. 1. This LCD signal may comprise textual information reporting on the depth of a scratch, graphic information outlining the shape of the scratch, or other information regarding the operation of the unit (for example, instructions or messages for the unit's operator). In the preferred embodiment, the LCD controller comprises a CY325 integrated circuit manufactured by Cybernetics Microsystems of San Gregorio, Calif. The LCD display 22 in the illustrated embodiment comprised a model AND7-11AST manufactured by AND of California. The video digitization module 36 and line edge data module 38 may comprise, for example, an AD9502BM integrated circuit manufactured by Analog Devices Inc. of Norwood, Mass.

Figure 3:
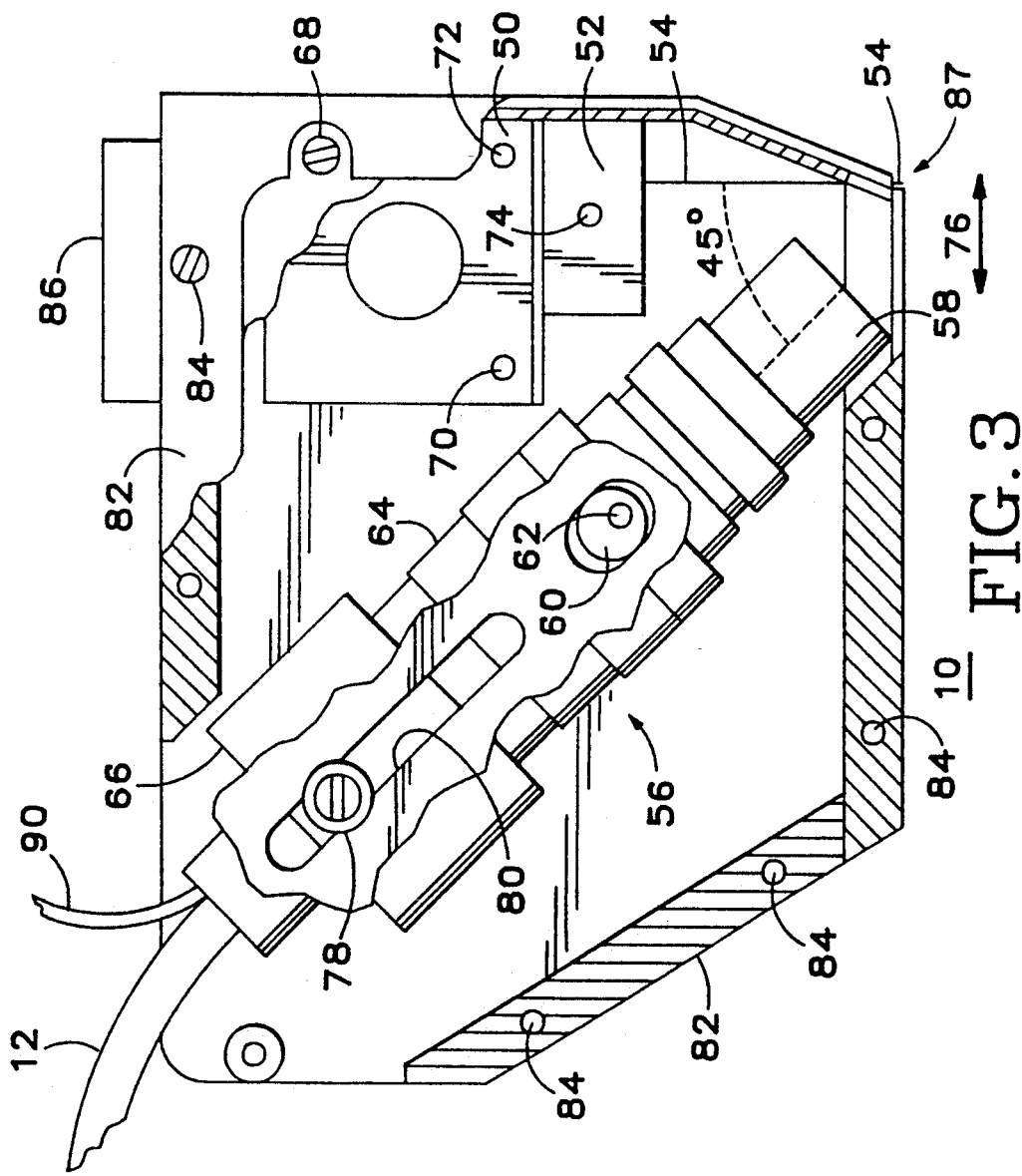
FIG. 3 is a side sectional view of the probe of the present invention.

Referring now to FIG. 3, a side sectional view of the scratch measurement system probe 10 of FIG. 1, the scratch measurement system of the present invention employs laser triangulation to gather depth data about the scratch. A line of laser light is projected onto the surface being examined. When viewed at an angle relative to the angle of projection, the image of the line of light will be orthogonally displaced by an amount relative to the depth of the scratch at any particular point along the line. The amount of displacement may then be employed to determine the depth of the scratch at any point along the line of light.

The scratched surface being measured may be initially prepared by applying a diffuse coating, to ensure uniform reflection of light. The diffuse coating may comprise, for example, opaquing fluid (or correction fluid) typically used in making corrections on paper (e.g. "LIQUID PAPER" brand opaquing fluid, manufactured by the Gillette Company of Boston, Mass.). Another suitable diffuse coating is a water-based white paint, for example, LIQUITEK brand titanium white acrylic paint, applied with a number 01 brush. With the opaquing fluid or paint measurement results have been accurate to 0.0002 inches. Also, a penetrant developer, part number HC-536 from Newport Corporation, has been successfully utilized, but evaporates rather quickly.

The probe 10 comprises a laser 50 producing a point light source directed downwardly through cylindrical lens 52 that expands the point light source into a line of light 54 projected onto the surface being measured. The particular embodiment of the invention is such that the laser is mounted in conjunction with the cylindrical lens to project the line of light orthogonal to the surface upon which the scratch is being measured and suitably at an angle or crossways to a scratch being measured.

Mounted at a predetermined angle relative to the projection plane of the line of light is vision system 56 for viewing the line of light as projected at an angle across the scratch and providing information indicative of the dimensions of the scratch. In the preferred embodiment, the vision system is mounted at 45 degrees relative to the plane of the line of light to provide a profile of a scratch cross section.

Vision system 56 comprises objective lens 58 mounted within probe 10 via adjustment cam 60 and mounting screw 62. In the preferred embodiment, the objective lens is a 10-power lens and serves to magnify the image of the scratch. The objective lens is mounted in an objective extension tube 64 extending diagonally from the base of sensor probe 10 to a position near the upper opposite end thereof. At the upper end is mounted camera sensor 66, in a preferred embodiment comprising a Pulnix TM-540 CCD camera, providing 510×490 pixels. This camera sensor supplies a video image of the magnified line of light projected on the scratch. A raster scan thereof is preferable crossways to the line of light. The video thus produced is then fed (via cable 12) to unit 14 (FIG. 2) for processing and the video image is also supplied to viewfinder 88 through cable 90 (FIG. 1) either directly from the camera or via unit 14.

In the preferred embodiment, laser 50 comprises a Keyence LD-153, LD-A152 class I laser, and cylindrical lens 52 is an Oriel Model 44010. A class II laser is also suitable. The class I or class II laser is employed with the invention for several reasons. First, the low power of the class I and class II lasers is desirable in that worker injury from viewing the laser is unlikely. Further, it is intended that one use for the invention is in measuring scratches in aircraft, and these measurements would be taken both at factory assembly lines as well as in airplane hangars and at airports. Therefore, it would not be appropriate to employ a high-power laser which could potentially be pointed toward a person or an incoming plane.

Still referring to the probe of FIG. 3, laser 50 is held in position by mounting bolts 68, 70 and 72, as extend through the body of the laser and the latter are secured at the opposite side thereof with nuts. The cylindrical lens 52 is positioned by adjustment screw 74 wherein movement of the lens to direct the line of light backward or forward along the direction of arrow 76 is thereby enabled. Movement of the adjustment screw 62 of cam 60 permits the objective lens to be tilted upwardly or downwardly in order to more precisely aim the lens to the position at which the line of light is desirably presented. The camera sensor 56 is held by adjustment 78 which slidably engages translation slot 80. The combination of adjustment 78 and translation slot 80 allows sliding of the camera sensor along a 45-degree angle to alter the position relative to the focal point of the lens. This enables fine focus adjustment so the sensor may be fine tuned to perceive a sharply focused image of the line of light projected on the scratch.

Extending substantially around the outer edges of the probe body is a synthetic resin polymer edge member 82, suitably TEFLON, making it possible for the probe to be moved along the surface being measured without causing further scratching or damage to the surface. The TEFLON edge member is held to the body of the probe via screws 84 regularly spaced around the edges of the probe. Mounted atop the probe member is a mounting shoe 86 adapted to removably mount viewfinder 88 (FIG. 1), the viewfinder comprising a video viewfinder such as those employed with standard video recorders. Viewfinder 88 provides a video image as may be observed by the user to assist in properly positioning the probe as well as for examining the scratched surface. While the illustrated viewfinder is shown mountably received by the probe, other appropriate viewfinders may be utilized, for example, the viewfinder may be of the type worn via a headband and held within the user's field of view. A video cable 90 connects the viewfinder 88 to the video signal as perceived by the video sensor 66. The detachable viewfinder is advantageously employed in that the probe may then be utilized to explore a scratch in difficult to reach places as would otherwise require the operator to assume an awkward position. Detaching the viewfinder from the probe enables the operator to place the probe in an appropriate position for inspecting the scratch, while viewing the same from a comfortable location. Such an operation is advantageous, for example, when the examiner is looking at a surface high above a runway or factory floor, as when standing in a "cherry picker" type device.

As may be observed, the probe is angled upwardly and away from the inspection surface at point 87, the viewing point, and this is advantageous in that the probe may be pivoted about point 87, as may be desired to keep a scratch in focus when using the probe on a curved surface.

Figure 4:
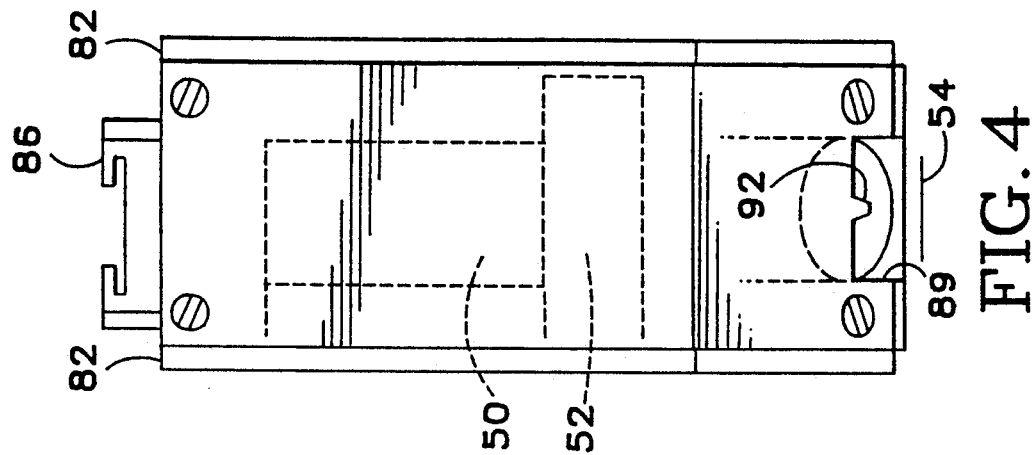
FIG. 4 is an end view of the probe.

Referring now to FIG. 4, an end view of the probe, the TEFLON edge members 82 are seen to be attached at both sides of the probe for providing scratch-free sliding along various surfaces. At the base of the probe, at the viewing point thereof, a viewing aperture 89 with a nib 92 is also provided for indicating the center of the viewing point. This nib assists the operator in initial placement of the probe in position near the scratch of interest.

Figure 5:
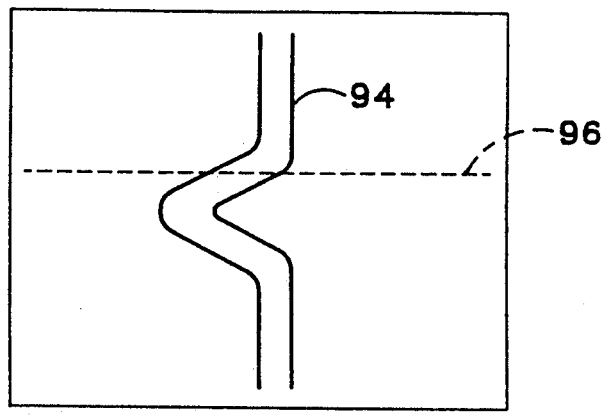
FIG. 5 illustrates a display of a scratch as seen through the viewfinder of the FIG. 1 system.

Referring now to FIG. 5, a display of a scratch is illustrated as seen through the viewfinder 88. The scratch appears as a band of light 94. The view thus provided is indicative of the depth of the scratch.

Figure 6:
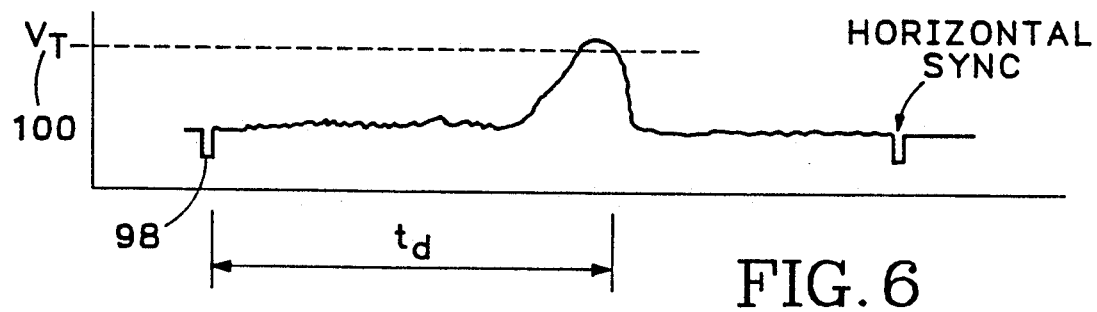
FIG. 6 is a graph illustrating the video threshold of a scratch signal.

Referring now to FIG. 6, a graph illustrating the video threshold detection employing raster scanning across the light line according to the present invention, when the video signal of FIG. 5 is scanned horizontally along scan line 96 (for example) the scanning begins with horizontal sync pulse 98. When the sync pulse occurs, a timer is started. The video voltage level is fairly constant until a point such as the line of light scratch image is reached, whereupon the video voltage level rises until exceeding the video threshold 100 ($V_T$). The timer is stopped once the threshold is exceeded. The time delay between the horizontal sync pulse and the indication that the video threshold has been exceeded ($t_d$) provides an indication of the location of the line of light (i.e. a pixel number where the transition beyond the threshold occurred). The position of the transition is then saved in the data storage of FIG. 2. Repeating the threshold detection for each scan line, and saving the data, results in determination of the scratch across the field of view. The method of saving a single point for each scan line enables capturing the image of the scratch with minimal data storage requirements as contrasted with saving an entire image field. In the preferred embodiment, each pixel across the camera horizontal field of view equates to approximately 0.5 mil. The particular threshold value is determined experimentally to be approximately 70 percent of the video sensor's saturation value.

Figure 7:
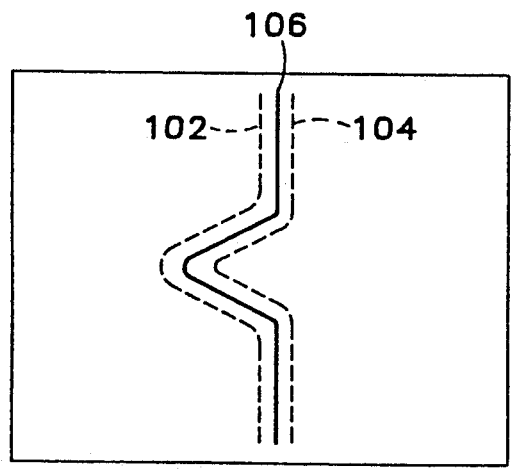
FIG. 7 is a graph comparing an original scratch laser line with the threshold data.

FIG. 7 illustrates the original video signal as indicated by dotted lines 102 and 104 with the detected threshold data line 106 superimposed thereon. It may be observed that the threshold line approximates the shape of the laser line, providing an indication of the scratch.

Referring now to FIG. 8, illustrating a video image of a scratch with the measured digital data superimposed thereon, it may be observed that a number of pixels 108 have been generated by the threshold detection circuitry, shown here superimposed over the original laser image borders 102 and 104. A number of data points fall outside the actual expected image threshold point, and such aberrations would provide erroneous measurement results if not appropriately resolved. Therefore, the scratch measurement device according to the present invention employs digital signal processing and filtering techniques to accommodate such data aberrations. The aberrations appear for a variety of reasons, one of which is that the threshold may not have been appropriately detected in a particular line of data, resulting in the pixel values observable at the left of the screen in FIG. 8. Furthermore, electrical noise or the like can generate erroneous data values.

FIG. 9 illustrates a display of data acquired by the scratch measurement system of the present invention as displayed on LCD display 22 (FIG. 1). In the display of FIG. 9, no filtering has taken place. FIG. 10 illustrates a display produced once the digital signal processing analysis is enabled (by activating analysis switch 26 of FIG. 1). It may be observed that the outlying data which is beyond the expected values is then removed from the display. Further, it should be noted that the display is desirably automatically scaled, providing a full screen view.

Referring now to FIG. 11, illustrating a display of the measurement as shown on display 22 with both the signal processing analysis and low pass filter enabled, it will be observed that the high frequency components of the waveform have been smoothed. Also, the depth of the scratch is displayed in the format "DEPTH=xx.xxxx", wherein in the example shown, the value 57.0000 is given.

Figure 12:
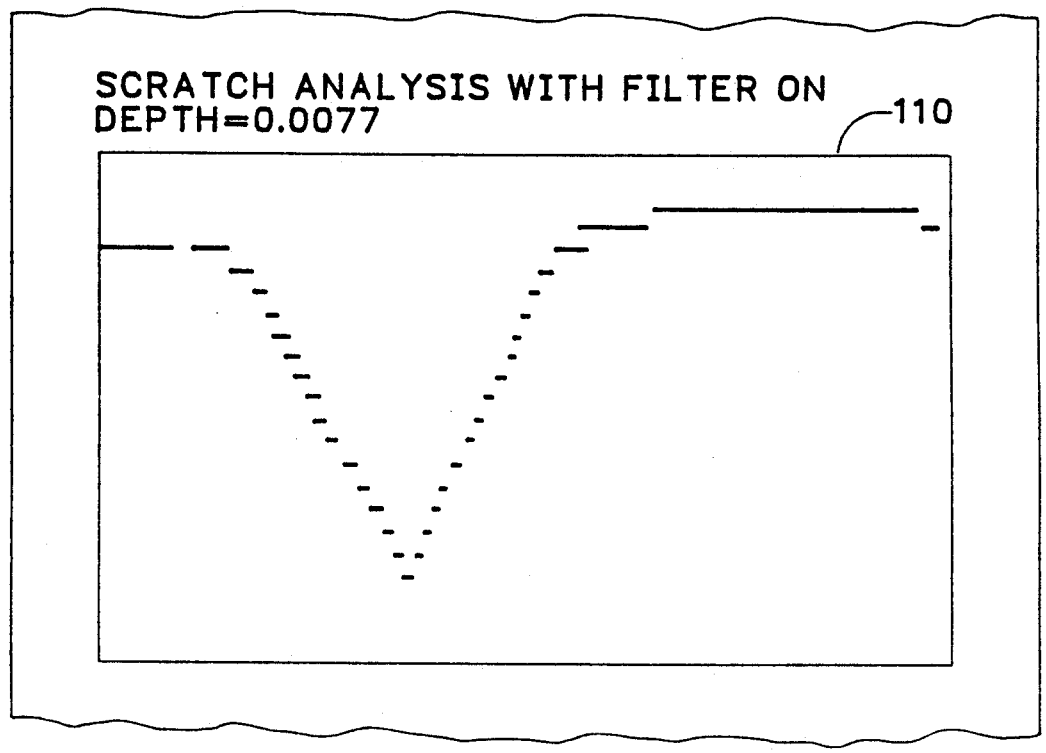
FIG. 12 is a scratch analysis report produced in accordance with the present invention.

As noted hereinabove with reference to FIG. 1, the measurements may also be printed by printer 16 for providing a hard copy result of the scratch measurement. FIG. 12 illustrates a sample printout provided by the present invention, wherein the outline of the scratch is displayed surrounded by a border 110. Printed above the border is a report of the scratch depth as well as an indication of whether the analysis and filter options were enabled when the measurement was taken. The measurements may thereby be saved for further study away from the hangar or factory floor, or employed for documentation purposes.

Figure 13A:
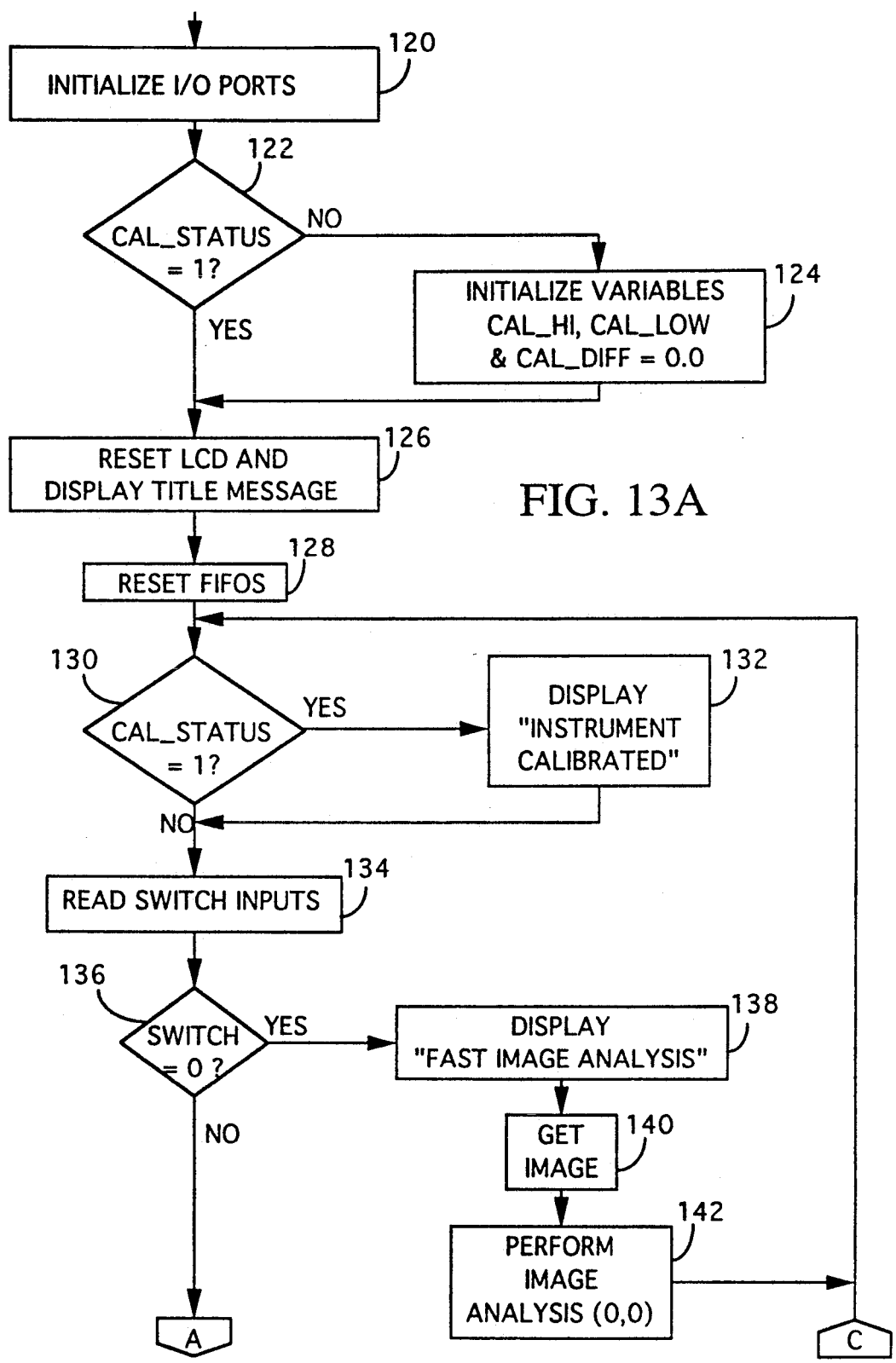
FIGS. 13A-13D taken together comprise a flow chart of the processing steps performed according to the invention.

The various operations of the scratch measurement system according to the present invention are governed by a program which instructs the CPU and other hardware to obtain and interpret the data from the vision system. FIGS. 13A through 13D taken together comprise an overall flow chart of the processing steps performed by the present invention. Referring now to FIG. 13A, processing begins in step 120, where the I/O ports for the system are initialized, followed by decision block 122 wherein it is determined whether the calibration status of the unit is true (CAL_STATUS=1). If the unit is not calibrated, then the variables CAL_HI, CAL_LOW and CAL_DIFF are all initialized to zero (step 124). CAL_HI represents a high measurement calibration value, while CAL_LOW is the low end calibration value. CAL_DIFF is the difference between the high and low calibration values. The high and low calibration values represent a high end and low end measurement wherein a straight line interpolation is used in between the two to determine measurements. The calibration steps are described in detail with reference to FIGS. 17A through 17B herein.

Next, whether or not the unit was calibrated, block 126, is entered wherein the LCD display (display 22 of FIG. 1) is reset to be in an initialized state and a title message is shown as may comprise a version release number for the particular unit (step 126). Continuing with step 128, the data storage FIFOs for the image data are reset to an initial state. After the FIFOs are reset, decision block 130 is entered wherein it is again determined whether the calibration status is true (CAL_STATUS=1?). If the calibration status is true, the message "INSTRUMENT CALIBRATED" is shown on LCD 22 (block 132). Then, whether or not block 132 is performed, the process continues with step 134 wherein the control switches of unit 14 are read (e.g. switches 26, 28, 30 and 32 of FIG. 1). After the input switches have been read, the value so read is examined to determine the state of the control switches. First, in decision block 136, it is determined whether the switch value read was equal to zero. If the switch value is zero, none of the switches 26 through 32 have been placed in the ON position. Therefore, the process will enter block 138 wherein the message "FAST IMAGE ANALYSIS" is shown on display 22, thereby conveying that image information will be displayed without performing any analysis or filtering thereof.

After step 138, step 140 obtains an image from the vision system followed by step 142 wherein the image is analyzed with the parameters (0,0) passed to the analysis routine. Once the analysis routine has finished, the process loops back at decision block 130, and continues looping until such time as the unit is reset or powered down. The process of obtaining an image in block 140 is described in greater detail with reference to FIG. 14 herein, while the image analysis routine of step 142 is described in greater detail with reference to FIGS. 15A through 15B.

Figure 13B:
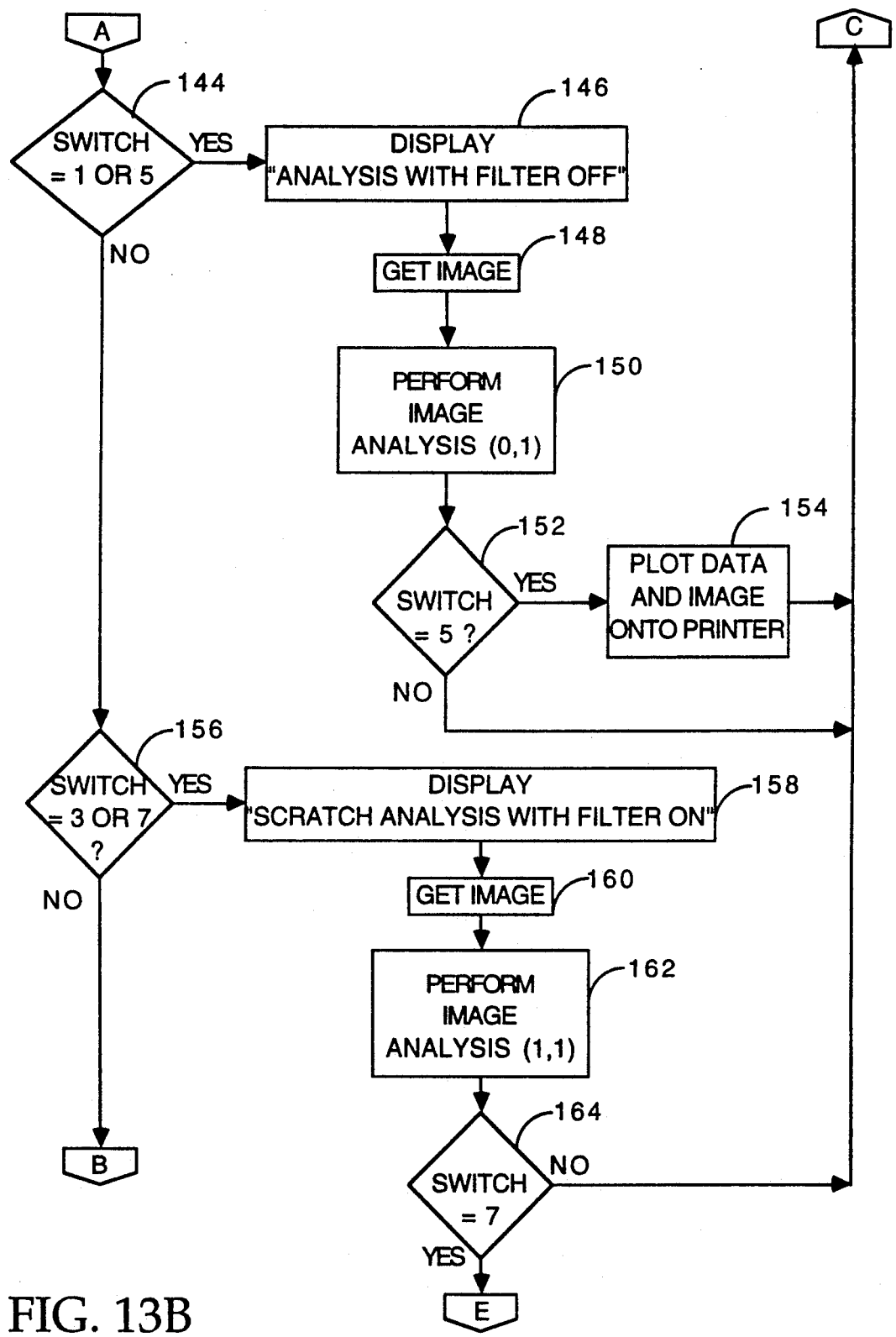

Referring again to decision block 136, if it is determined switch inputs which were read in block 134 are not equal to zero, the process proceeds with off-page connector A at FIG. 13B.

Off-page connector A enters FIG. 13B at decision block 144 wherein it is determined whether the input switch value is equal to either one or five. If the switch is either one or five, the program follows with step 146 wherein the message "ANALYSIS WITH FILTER OFF" is displayed. It may be understood that a switch value of one or five indicates that the analysis switch 26 is in the ON position, but the filter switch 28 is toggled to the OFF position. Once the message is displayed in block 146, step 148 ("GET IMAGE") is performed wherein the image of the scratch is obtained from the vision system. The "GET IMAGE" steps performed in block 148 correspond to the steps explained herein with reference to FIG. 14. After the image is acquired, step 150 calls an image analysis routine with the arguments (0,1) to process the scratch image with analysis but without filtering. The analysis steps and the parameters supplied thereto may be better understood with reference to FIGS. 15A through 15B, as discussed hereinbelow.

Once the analysis step 150 is complete, it is determined whether the switch value which was read at block 134 of FIG. 13A is equal to five (decision block 152) and if so, the depth data and image acquired by the vision system are plotted on printer 16 of FIG. 1 (block 154). The process proceeds to off-page connector C, returning to continue execution with decision block 130 of FIG. 13A wherein the instrument loops, reading switch inputs and reacting appropriately. If in decision block 152 the switch was not equal to five, no printing takes place and the processing continues directly with off-page connector C, returning to decision block 130 of FIG. 13A.

Referring again to decision block 144, if the switch value is not one or five, the process enters decision block 156, wherein it is determined whether the switch is equal to three or seven. If the switch value is neither three nor seven, execution continues with off-page connector B described with reference to FIG. 13C herein. However, if the switch value is either three or seven, block 158 is performed wherein the message "SCRATCH ANALYSIS WITH FILTER ON" is displayed on the LCD, indicating that both the analysis and filter switches 26 and 28 have been placed in the ON position. After the message is displayed, then in step 160, an image is obtained from the vision system (as described in conjunction with FIG. 14) and the image analysis routine is performed (step 162) with the arguments (1,1) as discussed herein with reference to FIGS. 15A through 15B. Once the image analysis is completed, decision block 164 is entered to determine whether or not switch was equal to seven. If switch is not seven, the processing steps proceed with off-page connector C at FIG. 13A, continuing again with decision block 130. However, if switch is seven, the process will follow off-page connector E (FIG. 13C) wherein a hard copy output of the scratch measurement data will be produced on printer 16 of FIG. 1.

Figure 13C:
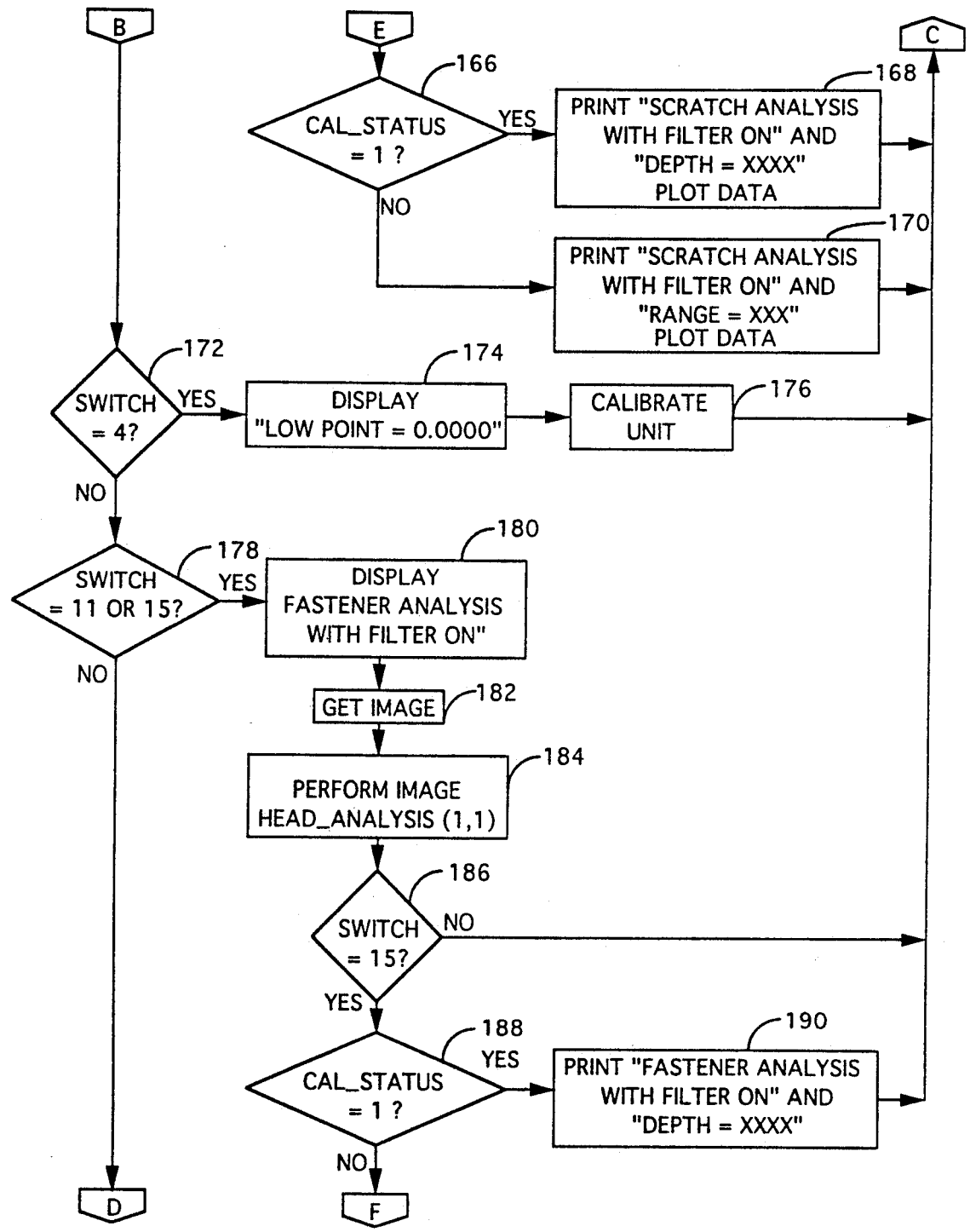

Referring now to FIG. 13C, off-page connector E enters at decision block 166 wherein it is determined whether the unit is calibrated (i.e. is CAL__STATUS=1?). If the unit is calibrated, the message "SCRATCH ANALYSIS WITH FILTER ON" is printed along with the text "DEPTH=xxxx", wherein "xxxx" is replaced with the measured depth value, and then a graphic image of the data is plotted (step 168). A sample of the output produced by step 168 is provided in FIG. 12 herein. If, however, at decision block 166 the unit is not calibrated, the message "SCRATCH ANALYSIS WITH FILTER ON" is printed along with "RANGE=xxx" wherein RANGE is the range data measured by the unit (determined herein in accordance with steps described in connection with FIG. 15B), and finally, the graphic image of the scratch is plotted (step 170). Once either step 168 or 170 is completed, processing continues at off-page connector C (FIG. 13A).

Still referring to FIG. 13C, off-page connector B (coming from FIG. 13B, following a "no" result at decision block 156) begins with decision block 172 wherein a determination is made whether the switch input value is equal to four. If switch is four, the calibration switch 30 (FIG. 1) is in the ON position. The message "LOW POINT=0.0000" is shown on the screen 22 (step 174), indicating the low calibration value is set to 0.0000. In the preferred embodiment, calibration is accomplished by setting low and high measurement points based on measurements of known calibration standards. This calibration takes place in the "calibrate unit" process 176, described in detail herein with reference to FIGS. 17A through 17B. Once calibration is completed, processing follows with off-page connector C (FIG. 13A).

Referring again to decision block 172, if the switch is not equal to four, decision block 178 determines whether the switch is equal to either 11 or 15. The switch value will be 11 or 15 if a fastener analysis switch (not illustrated) is placed in an ON position. This fastener analysis is provided in a second embodiment of the invention wherein the scratch measurement type system is employed in measuring the head height of a fastener (e.g. a rivet) relative to the surrounding surface. If the switch value is neither 11 or 15, then the program goes to off-page connector D as described in conjunction with FIG. 13D. If, however, switch is 11 or 15, step 180 displays the message "FASTENER ANALYSIS WITH FILTER ON" in liquid crystal display 22 followed by step 182, which obtains an image of a fastener from the probe 10. The particular steps of acquiring an image are described herein in conjunction with FIG. 14. After the image has been retrieved from the probe, the image HEAD__ANALYSIS routine is performed (step 184) with the arguments (1,1). This analysis routine then determines the head height of a fastener according to the steps described herein in conjunction with FIGS. 19A through 19C.

After step 184, decision block 186 determines whether the switch input is equal to 15. If not, no printout is made of the fastener measurements and the program continues with off-page connector C (FIG. 13A). However, if the switch is 15 at decision block 186, decision block 188 determines whether the instrument is calibrated (CAL__STATUS=1). If so, the message "FASTENER ANALYSIS WITH FILTER ON" is generated at the printer along with the message "DEPTH=xxxx", wherein "xxxx" is replaced with the head height of the measured fastener (step 190). Once step 190 is completed, processing proceeds at off-page connector C (FIG. 13A). If, however, in decision block 188 the calibration status is not one, operation follows off-page connector F of FIG. 13D.

Figure 13D:
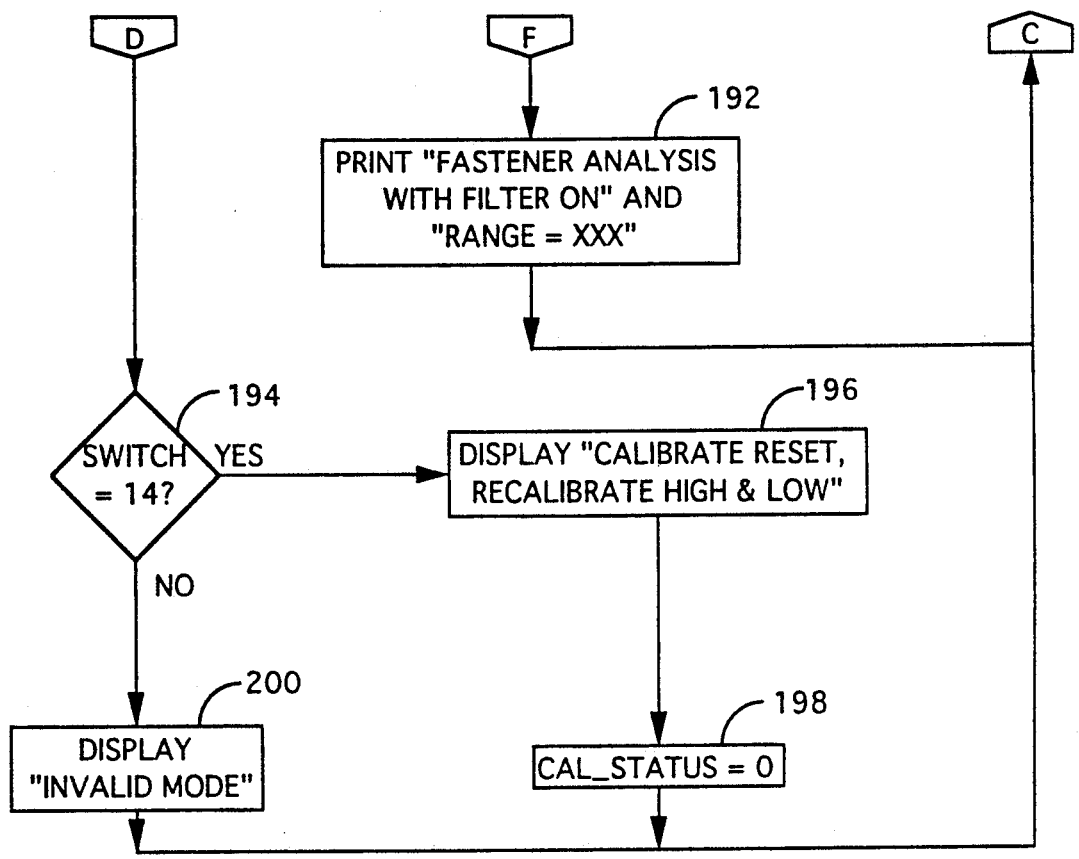

Referring now to FIG. 13D, off-page connector F begins with block 192 wherein the message "FASTENER ANALYSIS WITH FILTER ON" is supplied to the printer 16, followed by the message "RAN- GE=xxx", wherein "xxx" is replaced by the determined fastener head range measurement. Once step 192 is completed, processing continues with off-page connector C (FIG. 13A).

Referring still to FIG. 13D, off-page connector D, which is reached if decision block 178 (FIG. 13C) determines that the switch input value was not 11 or 15, enters at decision block 194, wherein a determination is made whether switch is equal to 14. If so, in step 196, the message "CALIBRATE RESET, CALIBRATE HIGH AND LOW" is shown on display 22. The switch value of 14 is generated if the calibration switch 30 of FIG. 1 has been enabled. After the message is displayed, the calibration status is set to false in step 198 (CAL_STATUS=0) whereupon processing proceeds at off-page connector C (FIG. 13A).

Referring again to decision block 194, if the switch input value is not 14, no valid switch input has been received and the message "INVALID MODE" is displayed on liquid crystal display 22 (step 200). After the "INVALID MODE" message has been shown, the program proceeds via off-page connector C (which enters FIG. 13A at decision block 130).

While in the illustrated embodiment of the invention the system acquires and displays images (at the rate of approximately one image every five seconds), an alternative embodiment may include a "record data" button on either probe 10 or unit 14, wherein the system does not perform the "GET IMAGE" steps until the record button is depressed.

The above-described steps comprise the overall operation of the scratch measurement system. Details of various functions will now be explained in greater detail.

Figure 14:
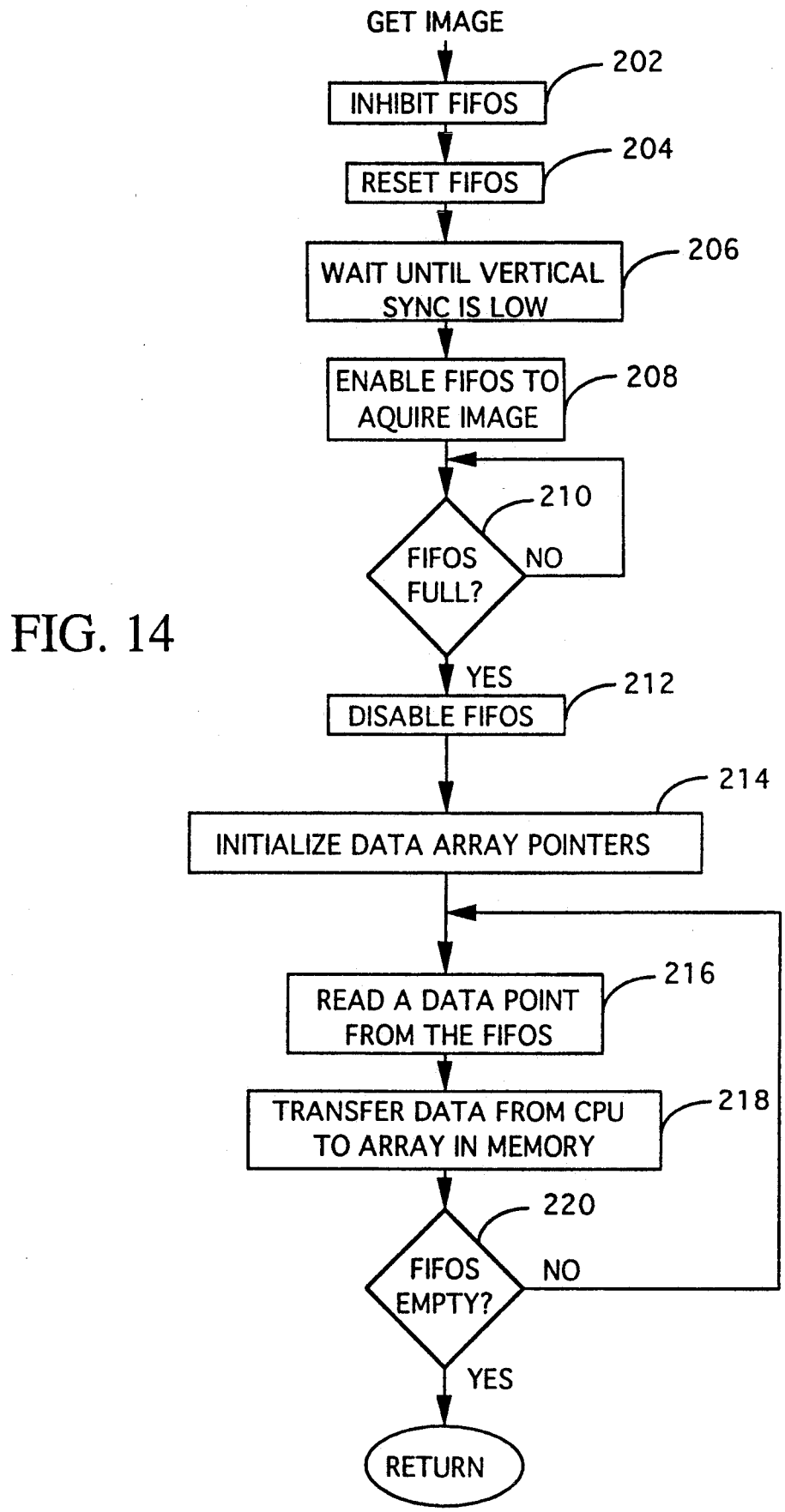
FIG. 14 is a flow chart of the steps of obtaining an image.

Referring now to FIG. 14, the steps performed in obtaining an image from the probe unit 10 may be better understood. First, the process begins by inhibiting the FIFO data storage chips (step 202) wherein the data acquisition memory is inhibited to prevent any more data from being stored therein. Next, in step 204, the FIFOs are reset, clearing the memory and initializing storage pointers. The process then waits until the vertical sync of video camera 66 (FIG. 3) goes low, i.e. once the video input has performed a vertical retrace, beginning a fresh field of scanning (block 206), whereupon the FIFOs are enabled to allow them to begin storing the image data as it is generated (block 208).

Once the FIFOs have been enabled and begin to acquire scratch image data, the process loops at decision block 210 waiting until the FIFOs are full, continuing to loop back if the FIFOs are not full. Once the FIFOs are full, the acquisition of data by the FIFOs is disabled in block 212, whereupon pointers to a data array for storing data from the FIFOs are initialized (step 214). After the data pointers are initialized, a data point is then read from the FIFOs in step 216, wherein a data point will comprise an indication of where along the horizontal trace a threshold value was encountered (described herein in conjunction with FIG. 6), thereby denoting the scratch image edge point. After the data point is read from the FIFO, it is transferred to an array in the system RAM (block 218) for further processing once all data has been retrieved. When the data has been transferred, decision block 220 determines whether the FIFOs are empty (i.e. whether the whole field of data has been retrieved) and, if not, the process loops back to read another data point at block 216, executing the read and transfer steps 216 and 218 until such time as a determination is made in decision block 220 that the FIFOs are empty. Once the FIFOs are empty, the process returns to continue processing from the point where the "GET IMAGE" routine was called. As noted herein in conjunction with FIGS. 13A through 13D, the "GET IMAGE" process is called at step 140, step 148, step 160 and step 182.

Figure 15A:
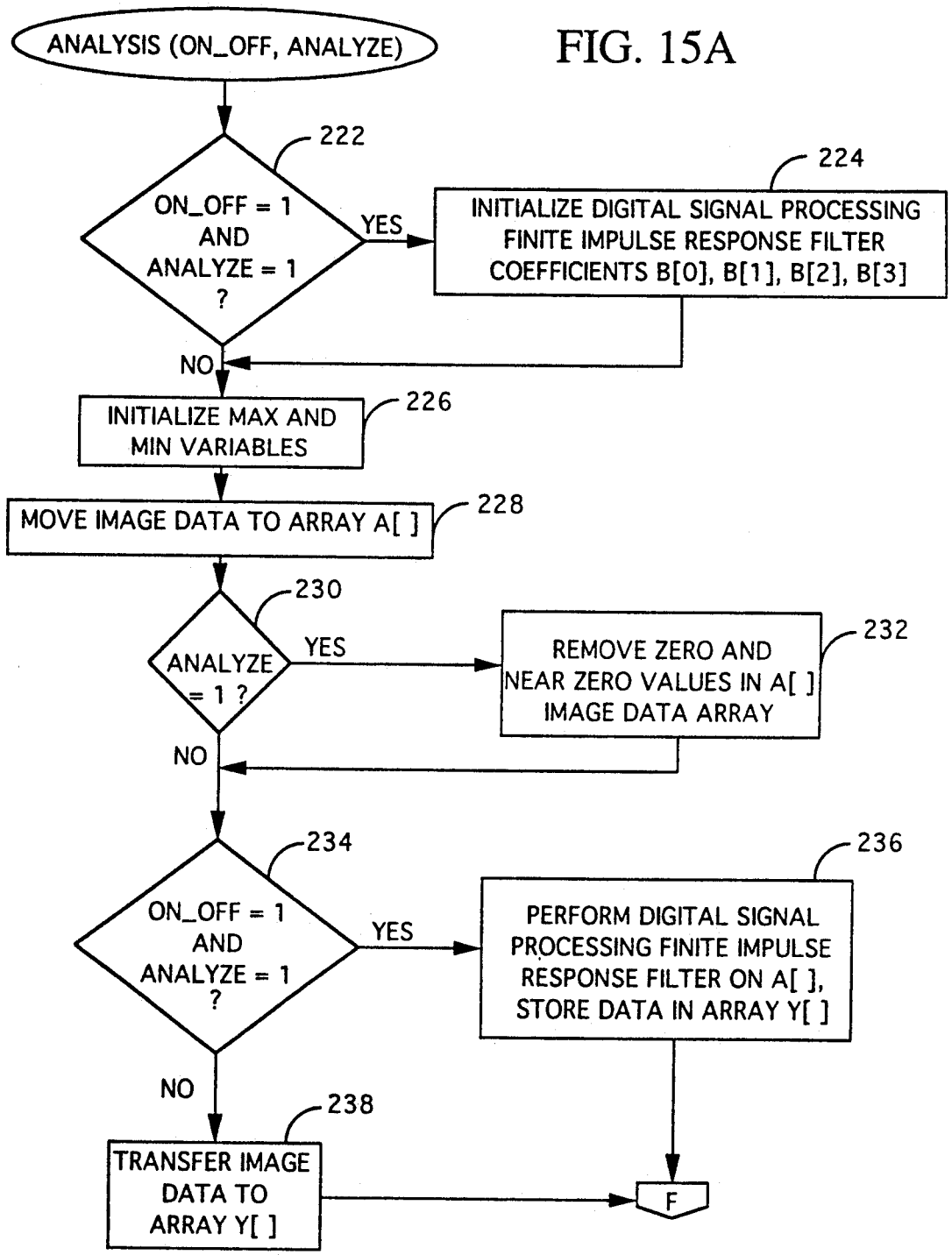
FIGS. 15A-15B comprise a flow chart of the analysis process performed according to the present invention.
Figure 15B:
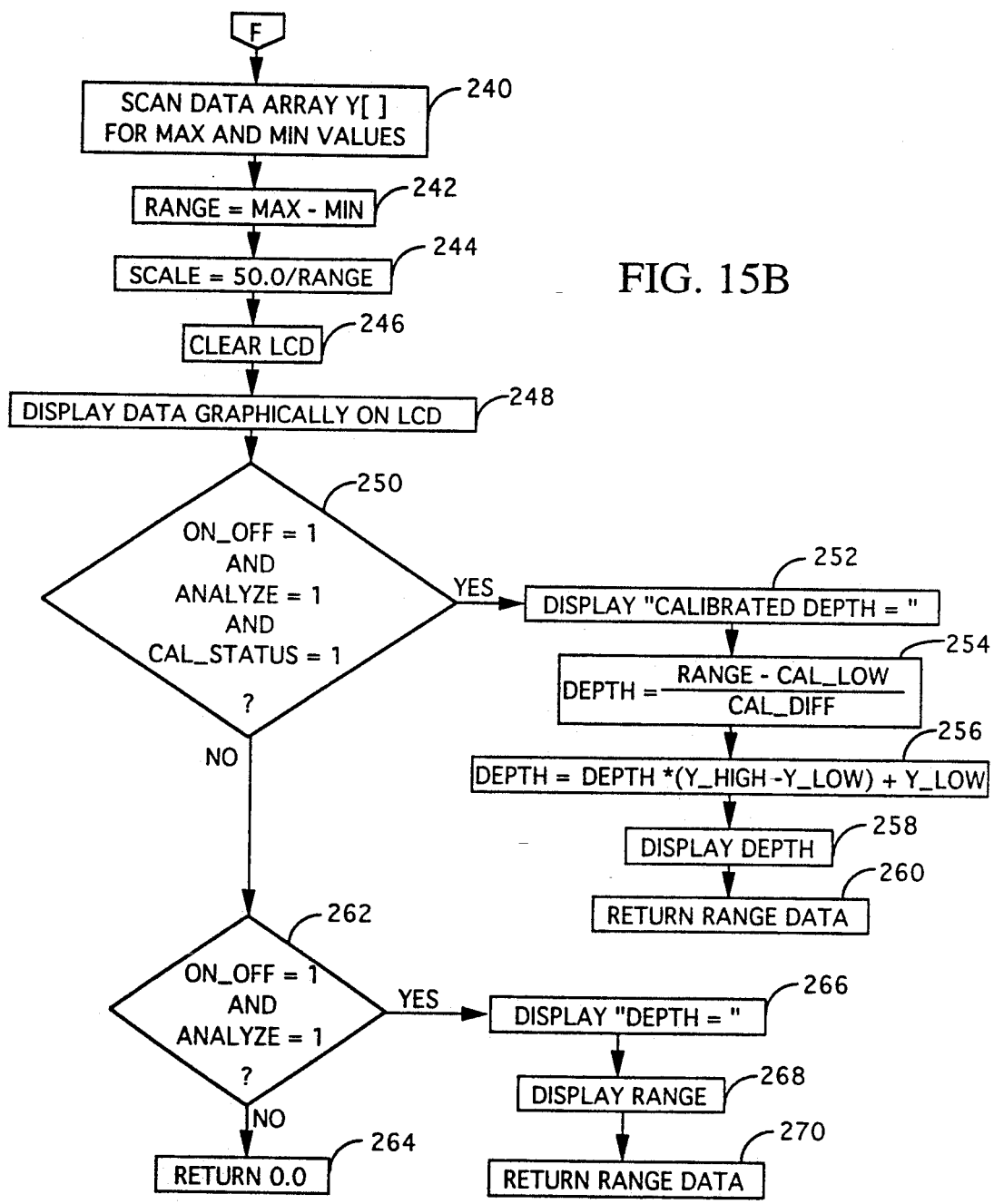

Referring now to FIGS. 15A and 15B, the analysis steps performed in filtering and analyzing the data acquired by the "GET IMAGE" process steps are described. The analysis routine takes two arguments, the first being an ON_OFF flag which indicates whether the filtering is on or off, as well as an ANALYZE flag which indicates whether analysis of the signal is enabled to remove image data which is near zero, i.e. out of the range of expected values. As noted herein with reference to FIGS. 13A through 13D, the analysis routine may be called with either ON_OFF set to zero or one and with ANALYZE set to either zero or one. Once the analysis routine is entered, the first step is to decide whether ON_OFF is equal to one and whether ANALYZE is equal to one (decision block 222). If this condition is true, process step 224 is performed wherein the coefficients for the digital signal processing finite impulse response filter are initialized, the coefficients being B[0], B[1], B[2], B[3]. These coefficients will be described in greater detail with reference to FIG. 16 herein wherein the filtering process steps are described.

Once step 224 is completed, processing proceeds with step 226 (or if the result of decision block 222 was that ON_OFF was not equal to one and ANALYZE was not equal to one, then processing proceeds directly with step 226) wherein two variables MAX and MIN are initialized. MAX and MIN are used to store the maximum and minimum measured data values acquired from the vision system. After the initialization, step 228 is performed wherein the image data which was acquired from the vision system is moved to an array A[]. Once the data is moved to the array A[], ANALYZE is again inspected to see if it is equal to one (decision block 230) and if so, the data in array A[], which represents the image data, is processed in step 232 to remove zero and near-zero data values. This step is employed to remove spurious data which may arise for any of the reasons described hereinabove with reference to FIG. 8.

In the illustrated embodiment of the invention, the array A[] containing the image data values comprised an unsigned integer array of length 230. Therefore, the step of getting rid of zero and near-zero values (the analysis step) is performed on the 230 values contained in the array. The specific steps performed are described herein with reference to FIGS. 20A through 20C. Once the image data array has been analyzed to remove the zero and near-zero values, processing then goes forward with decision block 234. Referring back to decision block 230, if the ANALYZE variable is not equal to one, processing proceeds directly with block 234, skipping the steps of block 232. In decision block 234, if both ON_OFF and ANALYZE are equal to one, the digital signal processing finite impulse response filter is applied to the image data in the array A[], and the results thereof are stored in the array Y[], processing then continuing with off-page connector F (FIG. 15B). If in decision block 234, ON_OFF and ANALYZE were not equal to one, block 238 is executed wherein the image data is transferred to the array Y[] without any filtering or analysis. Then the process follows off-page connector F of FIG. 15B.

Referring now to FIG. 15B, off-page connector F enters at step 240 which scans the data array Y[] to determine the maximum (MAX) and minimum (MIN) values contained therein, followed by step 242 which determines the variable RANGE, the range of values, by subtracting the minimum from the maximum value. Next, a value for the variable SCALE is computed (step 244) by dividing 50 by the value of RANGE as was computed in step 242, followed by step 246 which clears the LCD display 22 of FIG. 1. Next, the data in array Y[] is displayed graphically on the LCD (block 248), thereby producing a display as in FIGS. 11 and 12 herein.

After the data is displayed, decision block 250 is entered in which it is determined whether ON_OFF equals one, ANALYZE equals one and CAL_STATUS equals one. If the three variables are all equal to one, step 252 displays the message "CALIBRATED DEPTH=", followed by step 254 computing the variable DEPTH wherein:

$$DEPTH = \frac{RANGE - CAL\_LOW}{CAL\_DIFF}$$

Figure 17A:
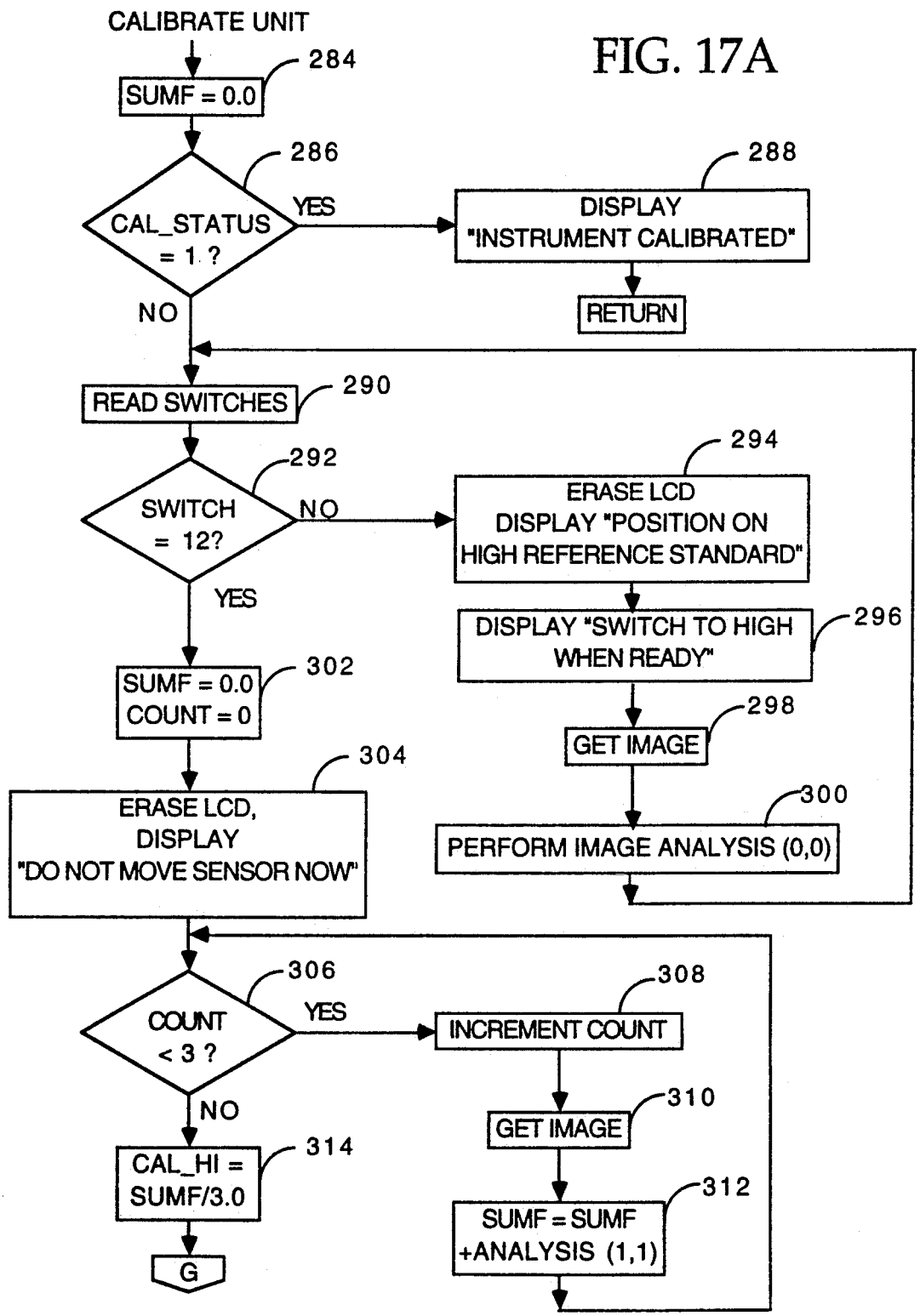
FIG. 17A-17B taken together comprise a flow chart of the steps of the calibration procedure according to the present invention.

CAL_LOW and CAL_DIFF are determined in accordance with the calibration routine described with reference to FIGS. 17A and 17B. Next, the final value of depth is determined (step 256) according to the formula:
DEPTH=DEPTH * (Y_HIGH—Y_LOW)+Y_LOW, where Y_HIGH and Y_LOW are determined based on the high and low measurement values expected. In the preferred embodiment Y_HIGH is equal to 0.0200 inches and Y_LOW is equal to 0.000 inches. The computed DEPTH value is displayed in step 258 and the routine then returns the RANGE data (computed in step 242 above) in block 260.

Referring back to decision block 250 if ON_OFF, ANALYZE and CAL_STATUS are not all equal to one, the program moves forward to decision block 262 for determining whether ON_OFF and ANALYZE are both one. If not, the process returns a value of 0.0 (step 264), but if these values are both one, then step 266 is performed wherein the text "DEPTH=" is displayed on the LCD followed by step 268 wherein the computed value of RANGE is displayed on the LCD, followed by step 270, which returns the computed RANGE data value, ending the steps of the analysis routine.

Figure 16:
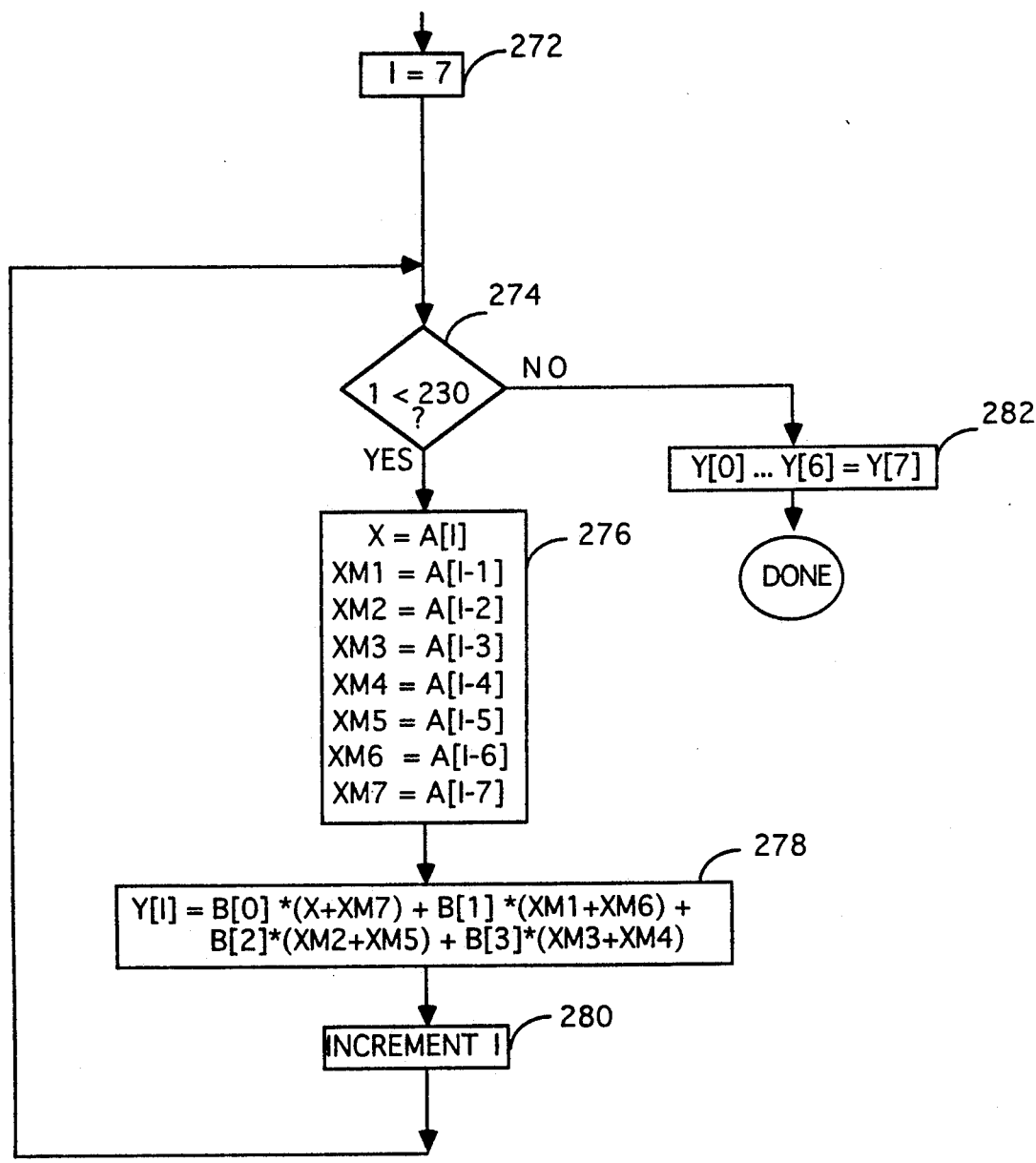
FIG. 16 is a flow chart of the digital signal processing finite impulse response filter steps employed by the present invention.

Referring now to FIG. 16, the steps of the digital signal processing finite impulse response filter (as executed in step 236 of FIG. 15A herein) begin with block 272 wherein a counter variable I is set equal to seven, followed by decision block 274 wherein it is determined whether I is less than 230, 230 being the size of the input data array in the illustrated embodiment. This value may change if a different number of input data values is provided. If the counter I is less than 230, then in block 276, the variable X is set equal to the value in the array entry A[I], the variable XM1 is set equal to the value stored in the input data array A[I-1], XM2 is set equal to the value contained in A[I-2], XM3 is set to the value of A[I-3], XM4 is set equal to A[I-4], XM5 is assigned the value stored in A[I-5], XM6 is set to the value of A[I-6] and XM7 is set equal to the image array data value stored in A[I-7]. Once the initial values of these variables are set, the actual filtering takes place (block 278) wherein the output variable array Y[I] is set equal to the value computed by B[0]* (X+XM7)+B[1]* (XM1+XM6)+B[2]* (XM2+XM5)+B[3]* (XM3+XM4), where B[0], B[1], B[2] and B[3] are the filter coefficients initialized in step 224 of FIG. 15A. In the particular embodiment, the coefficients were chosen as follows: B[0]=0.0073, B[1]=0.0298, B[2]=0.0885 and B[3]=0.1418. The chosen filter has an even symmetry; therefore the coefficients are symmetrical which enables the filtering to be performed with two adds and one multiply for each of four coefficients, rather than requiring one multiply for each of eight coefficients. The particular embodiment of the invention, which does not employ floating point processors, is able to perform the filtering in less time. Such a consideration would be less important if a different CPU or floating point processor were employed in a particular embodiment. The particular coefficients are calculated to provide the desired filtering response, and may be modified to provide a different response.

Once the filtered image data value has been computed, block 280 increments the counter I whereupon the process loops back to again enter decision block 274 to determine whether the counter I is still less than 230. If the counter is still less than 230, the filtering process steps 276, 278 and 280 are repeated. However, if the counter I is not less than 230, step 282 is performed wherein the output array entries Y[0], Y[1], Y[2], Y[3], Y[4], Y[5] and Y[6] are all set equal to be the value contained in the array entry Y[7]. Once this step is performed, the filtering process is done and execution proceeds from the calling point of the filter process (e.g. step 236 of FIG. 15A).

Next, referring to FIGS. 17A through 17B, the steps performed in calibrating the unit will be described in greater detail. These calibration steps are performed when called by step 176 (FIG. 13C). The basic calibration procedure involves calibrating to known low and high value calibration standards, wherein in the particular embodiment illustrated the high calibration standard was a 0.0200 inch depth slot, while the low calibration value was a zero depth slot, i.e. a flat surface. A straight line interpolation is then utilized to determine depths between these low and high points. The calibration steps begin with step 284 wherein a variable SUMF is set equal to 0.0 followed by decision block 286 wherein it is determined whether the unit has already been calibrated (i.e. CAL_STATUS=1). If so, the message "INSTRUMENT CALIBRATED" is displayed on the liquid crystal display 22 of FIG. 1 (step 288) and the program returns to the calling point thereof (step 176 of FIG. 13C). However, if the unit has not yet been calibrated, the front panel switches of the unit are read in step 290, followed by decision block 292 which determines whether the switch value is equal to 12 (a condition which occurs when switch 32 of FIG. 1 is placed in the HIGH position). If the switch is not equal to 12, i.e. the switch is in the LOW position, step 294 is implemented wherein the LCD 22 is erased and the message "POSITION ON HIGH REFERENCE STANDARD" is displayed, instructing the scratch measurement system operator to position the probe over the known standard. Next, the message "SWITCH TO HIGH WHEN READY" is displayed (step 296) instructing the operator to move switch 32 of FIG. 1 into the HIGH position once the unit is properly situated over the calibration standard.

Next, the image is acquired from the vision system in step 298 (in the manner described herein with reference to FIG. 14) and the image analysis routine is conducted (step 300) with the arguments (0,0), which results in a display of an image of the calibration standard appearing on LCD 22 for assisting the operator in appropriately positioning the probe unit over the calibration standard. After step 300, the process loops back to again read the switches in block 290, testing again whether the switch is equal to 12, and continuing steps 294, 296, 298 and 300 until such time as the operator has toggled switch 32 into the HIGH position. Once the switch is in the HIGH position, the result of decision block 292 will be "yes", whereupon step 302 sets the variable SUMF equal to 0.0, a counter variable COUNT is set equal to zero and then (step 304) the liquid crystal display is erased with the message "DO NOT MOVE SENSOR NOW" appearing on LCD 22, thereby instructing the operator to not disturb the position of the measurement probe since the calibration is being performed.

After the message is displayed in step 304, decision block 306 determines whether the loop counter variable COUNT is less than three and if it is less than three, COUNT is incremented (step 308) followed by step 310 which obtains the image from the vision system. Next, the variable SUMF is set equal to the previous value of SUMF plus the result of the analysis routine called with the parameters (1,1). As discussed herein with reference to FIGS. 15A through 15B, when analysis is performed with the arguments (1,1) and CAL_STATUS is zero, the analysis routine will return the range data (the maximum minus minimum measured values from the vision system). Once step 312 is completed, the process loops back to decision block 306 to again determine whether the COUNT is less than three, continuing to loop between decision block 306 through steps 308, 310 and 312 until such time as COUNT is no longer less than three whereupon step 314 is performed which computes the high calibration value CAL_HI to be equal to SUMF divided by three. The processing steps then proceed via off-page connector G of FIG. 17B.

Figure 17B:
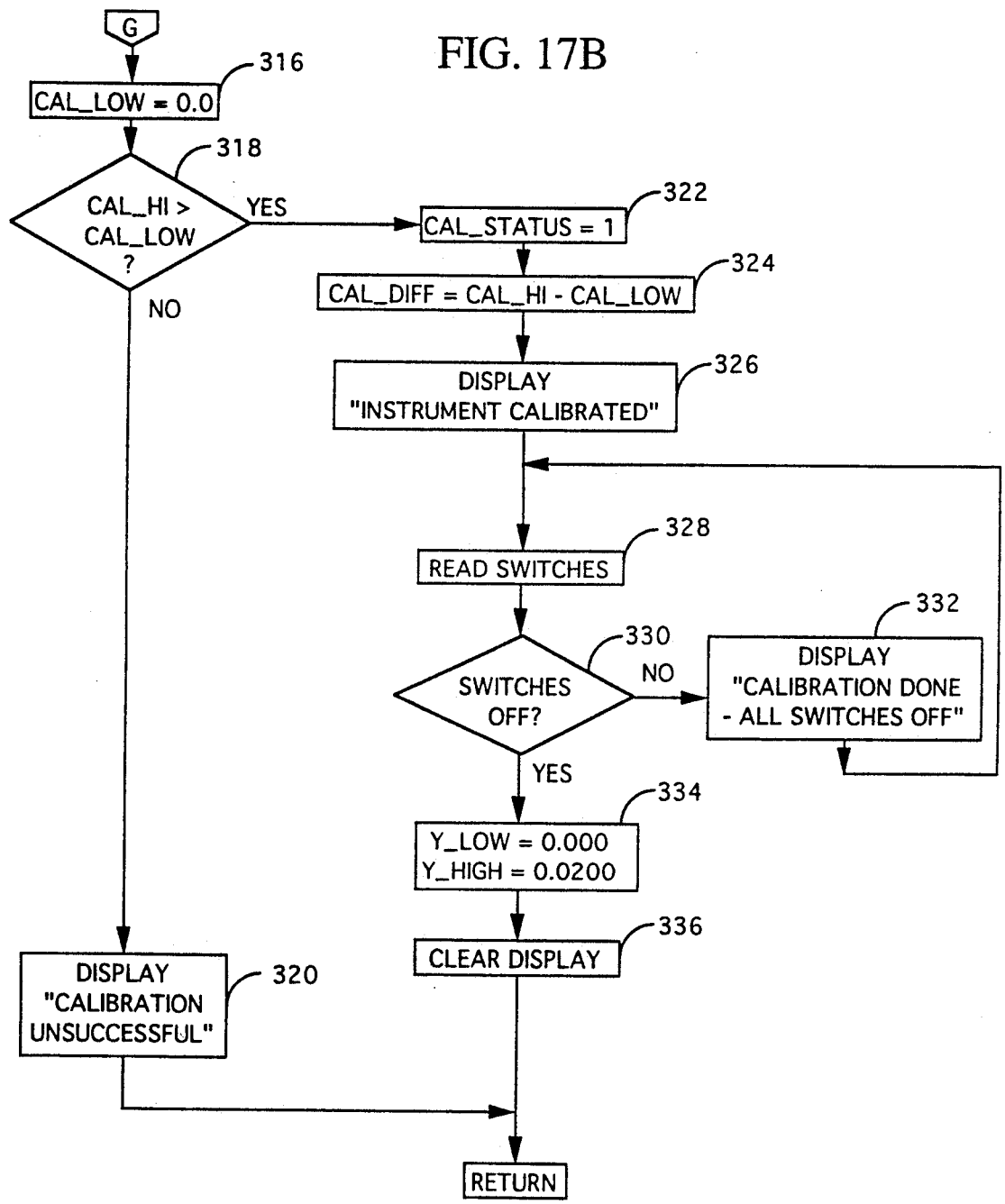

Referring now to FIG. 17B, off-page connector G enters at block 316 wherein the variable CAL_LOW is set to zero (since in the illustrated embodiment, the low calibration value is chosen to be zero; other arrangements could be employed with different low calibration standards). Next, decision block 318 determines whether CAL_HI is greater than CAL_LOW and if not, the calibration has not been successful. Since the calibration has been unsuccessful, the message "CALIBRATION UNSUCCESSFUL" is displayed on LCD 22 (block 320) and the calibration routine returns to its calling point. If it is determined in decision block 318 that CAL_HI is greater than CAL_LOW, CAL_STATUS is set equal to one (step 322), indicating the instrument has been calibrated. The variable CAL_DIFF, representing the difference between the high and low calibration values is set equal to CAL_HI minus CAL_LOW in step 324, and the message "INSTRUMENT CALIBRATED" is shown on LCD 22 of FIG. 1 in step 326 followed by step 328 reading the switches on the instrument panel. Once the switches have been read, decision block 330 determines whether all the switches are off, and if not, displays the message "CALIBRATION DONE—ALL SWITCHES OFF" in step 332 to instruct the operator to turn all the switches to the OFF position. After step 332 is completed, the process loops back to block 328 to read the switches with read, test and display steps 328, 330 and 332 until such time as the operator does turn the switches off. Once the switches are turned off, step 334 sets the variable Y_LOW to be 0.000 and Y_HIGH to be 0.0200 (the low and high measurement values). Step 336 then clears the display, completing the calibration steps whereupon the routine returns to its calling point (step 176 of FIG. 13C).

To obtain higher precision measurement, it can be desirable to modify the calibration procedure to include calibrating the individual camera lens to compensate for lens distortion. Such a lens calibration entails determining a correction factor for each pixel position, and incorporating the correction factor into the image data array values as the image is processed, thereby removing errors arising from lens distortion.

Figure 20A:
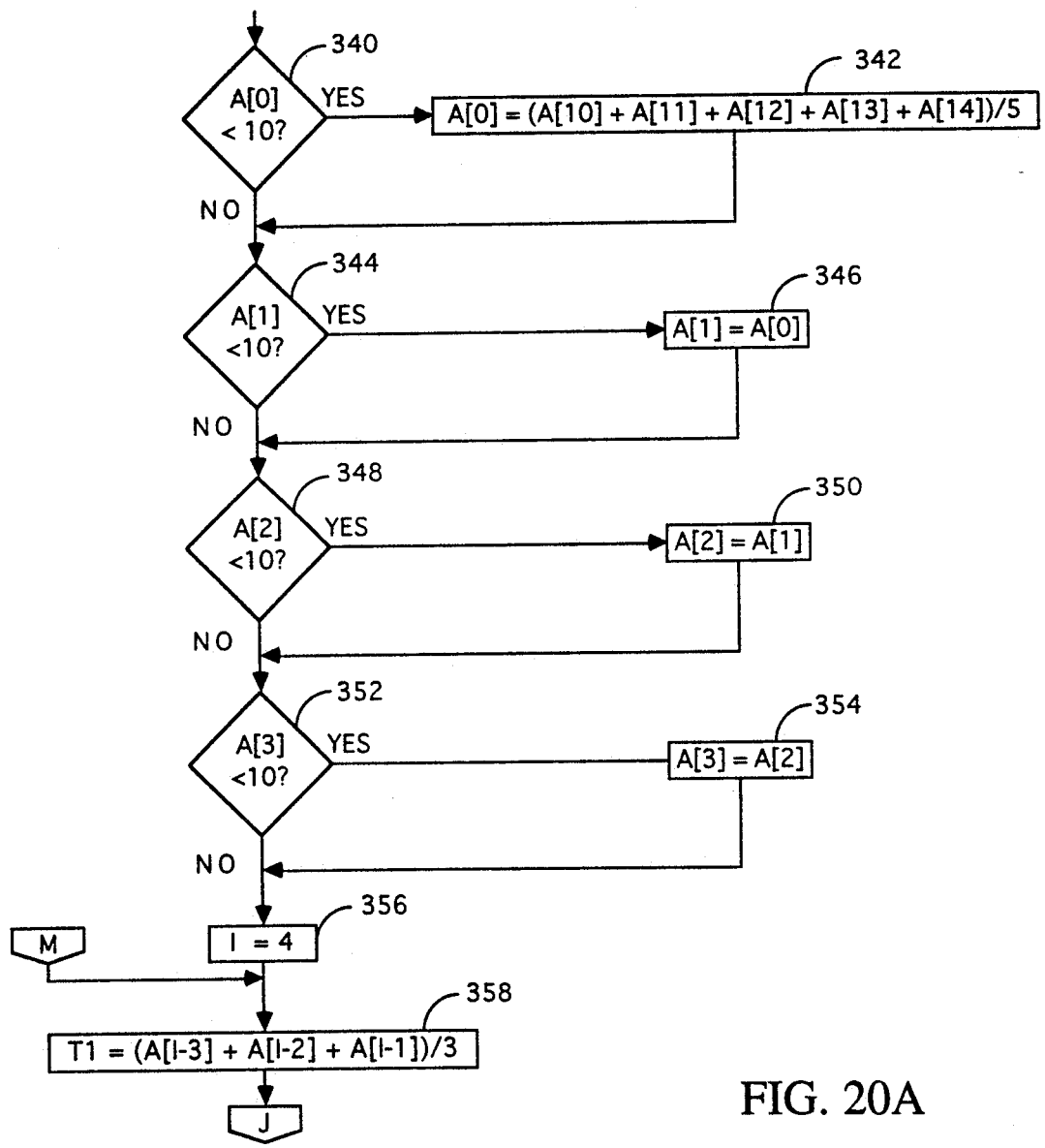
FIGS. 20A-20C together form a flow chart of the steps performed in removing zero and near-zero image data values.
Figure 20B:
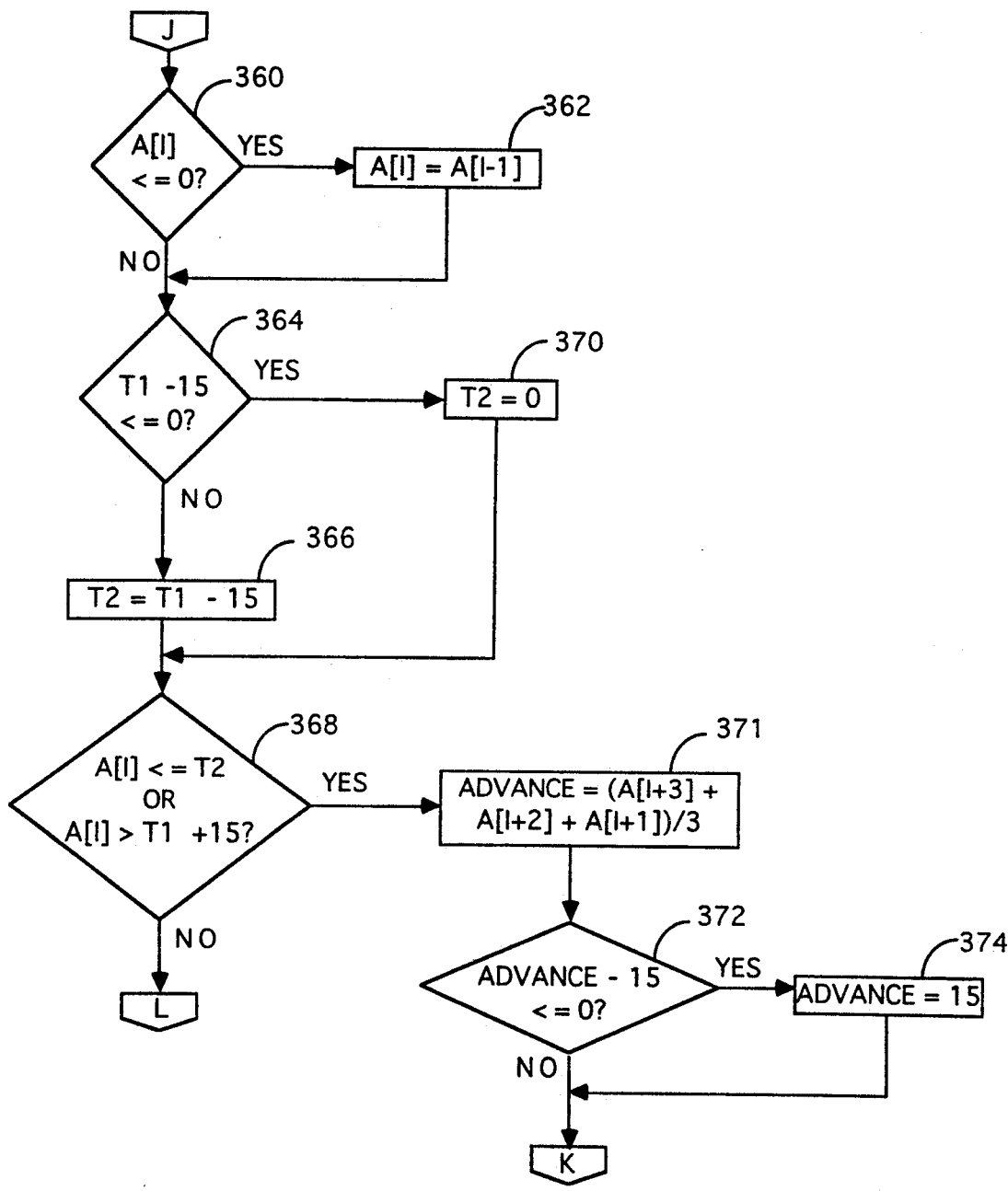
Figure 20C:
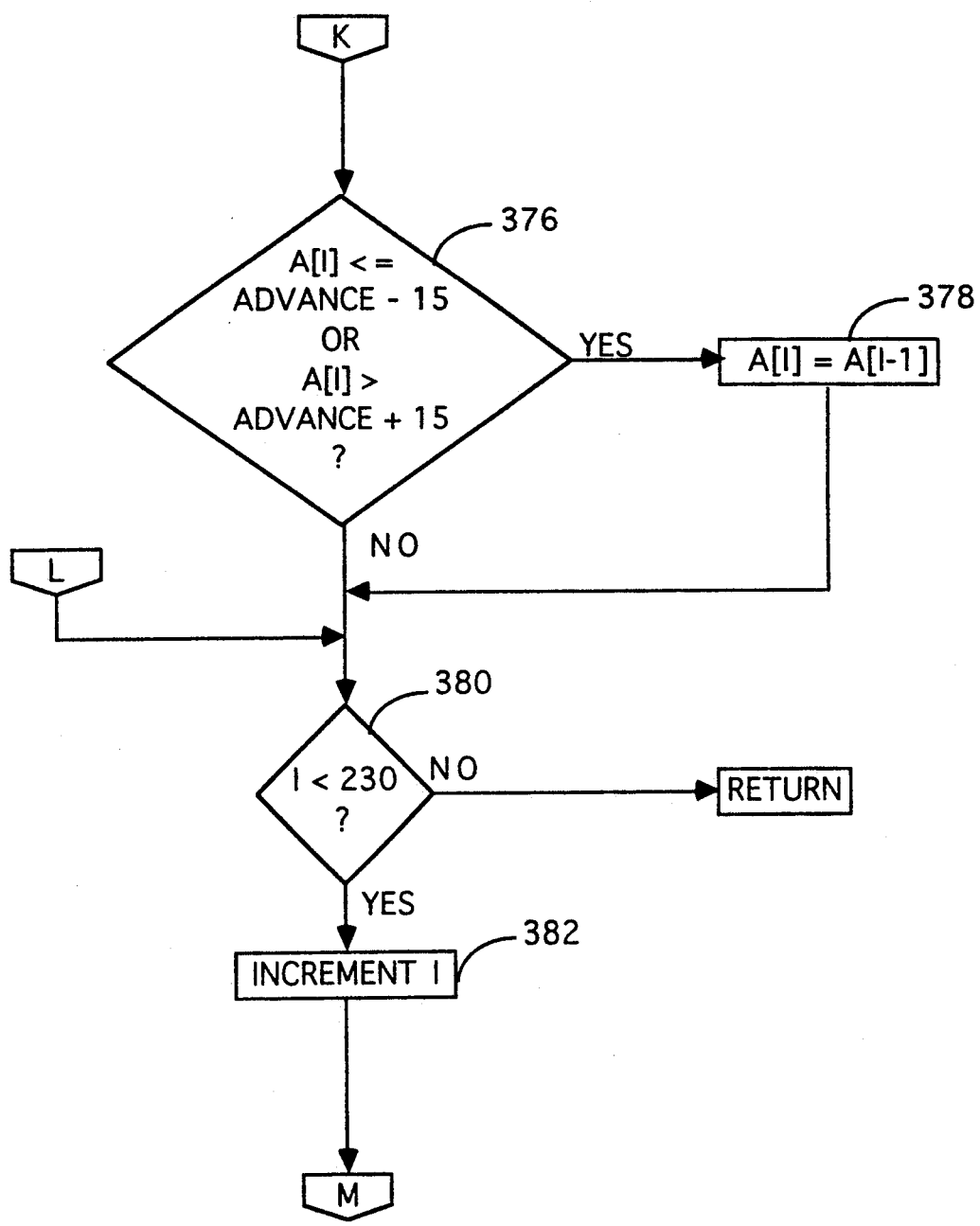

FIGS. 20A through 20C describe the steps performed by block 232 of FIG. 15A, the "remove zero and near-zero values in the image data array" process. The routine begins with decision block 340, determining whether A[0] is less than ten. If A[0] is less than ten, step 342 is conducted wherein A[0] is set equal to the average of A[10]+A[11]+A[12]+A[13]+A[14]. The processing then proceeds with decision block 344. Referring back to block 342, if A[0] is not less than ten, the process goes directly to decision block 344 wherein it is determined whether A[1] is less than ten. If the result of the test is "yes", A[1] is set equal to the value in A[0] by step 346. From step 346, processing continues at decision block 348 or, if in block 344 A[1] is not less than ten, processing goes directly to decision block 348 without performing step 346. In decision block 348, A[2] is examined and if it is less than ten, the image value in A[2] is set equal to the image value stored in A[1] (step 350), execution then continuing at decision block 352.

Execution proceeds directly to decision block 352 if A[2] is not less than ten at decision block 348. In decision block 352, if A[3] is less than ten, A[3] is set equal to the value stored in A[2] (step 354), but if A[3] is not less than ten, step 354 is not implemented. In any event, an index counter I is set to the value four in block 356 followed by step 358 wherein a temporary variable T1 is computed according to the following formula:

$$T1 = (A[I-3] + A[I-2] + A[I-1])/3$$

The processing steps now continue at off-page connector J of FIG. 20B wherein in decision block 360 if A[I] is less than or equal to zero, A[I] is set equal to A[I-1] in step 362 and processing then follows decision block 364. If A[I] is not less than or equal to zero in decision block 360, processing continues directly with decision block 364. In decision block 364, if temporary variable T1 minus 15 is not less than or equal to zero, a second temporary variable T2 is set equal to the value of T1 minus 15 in step 366 and processing then moves to decision block 368. However, if in decision block 364 T1 minus 15 is less than or equal to zero, variable T2 is set to zero (step 370) and processing is according to decision block 368.

Referring now to decision block 368, the image data array value A[I] is examined to determine whether it is less than or equal to T2 or whether it is greater than T1 plus 15. If the result of the test is "no", the program follows off-page connector L of FIG. 20C. However, if A[I] is less than or equal to T2 or is greater than T1 plus 15, step 371 sets the variable "ADVANCE" to be equal to A[I+3]+A[I+2]+A[I+1] divided by three (the average of the three values A[I+3], A[I+2] and A[I+1]) Next, in decision block 372 if ADVANCE minus 15 is not less than or equal to zero, processing is indicated by off-page connector K of FIG. 20C. However, if ADVANCE minus 15 is less than or equal to zero, ADVANCE is set equal to 15 (step 374) and then execution is via off-page connector K of FIG. 20C.

Referring now to FIG. 20C, off-page connector K enters decision block 376 wherein a determination is made as to whether A[I] is less than or equal to ADVANCE minus 15 or is greater than ADVANCE plus 15. If the determination generates a "yes" result, A[I] is set equal to the value in A[I-1] (step 378). However, if the test returns a "no" as an answer, step 378 is not performed. Processing is next defined at decision block 380, which is also the entry point for off-page connector L referred to in conjunction with decision block 368 hereinabove. In decision block 380, the counter I is examined to determine whether it is less than 230 (the number of data points in the array in the particular embodiment). If I is not less than 230, the entire data array has been processed to remove the zero and near-zero values (as well as to remove high frequency components), so the procedure returns. However, if I is less than 230, more of the array remains to be processed, so step 382 increments the counter I, and processing follows off-page connector M which enters FIG. 20A at step 358 wherein the temporary variable T1 is computed. The procedure will move ahead until the entire image data array has been processed.

Figure 18:
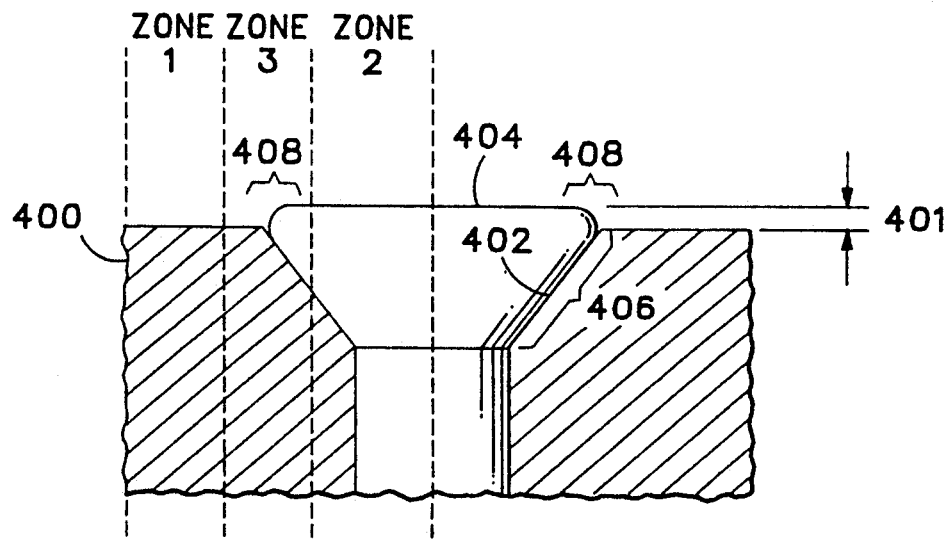
FIG. 18 is a sectional view of a sheet metal rivet measured by an embodiment of the present invention.

Referring now to FIG. 18, another type of analysis which may be performed by the measurement system of the present invention will be described. FIG. 18 is a sectional view of a metal sheet which has a rivet therein, illustrating considerations employed according to the present invention in measuring the rivet head height 401 above the sheet metal surface. The sheet metal 400 has a countersink 402 bored therein for abutting the head of a rivet 404. In some applications, it is desirable to measure the height of the rivet head above the sheet metal to determine whether the rivet is properly installed, or whether the countersink has been properly drilled. It will be observed in FIG. 18 that a region 406 exists wherein the rivet is flush with the sheet metal 400. However, there is a gap in a region 408 near the surface of the sheet metal wherein the rivet and sheet metal are not in engaging relationship. Therefore, it becomes necessary to process optical measurement data to compensate for the fact that a gap exists in the area 408, as may provide erroneous measurement if the measurement information at the gap is also included in the depth calculation. Therefore, an analysis routine is employed by the scratch measurement system of the present invention which removes the potentially confusing data from measurement consideration.

Figure 19A:
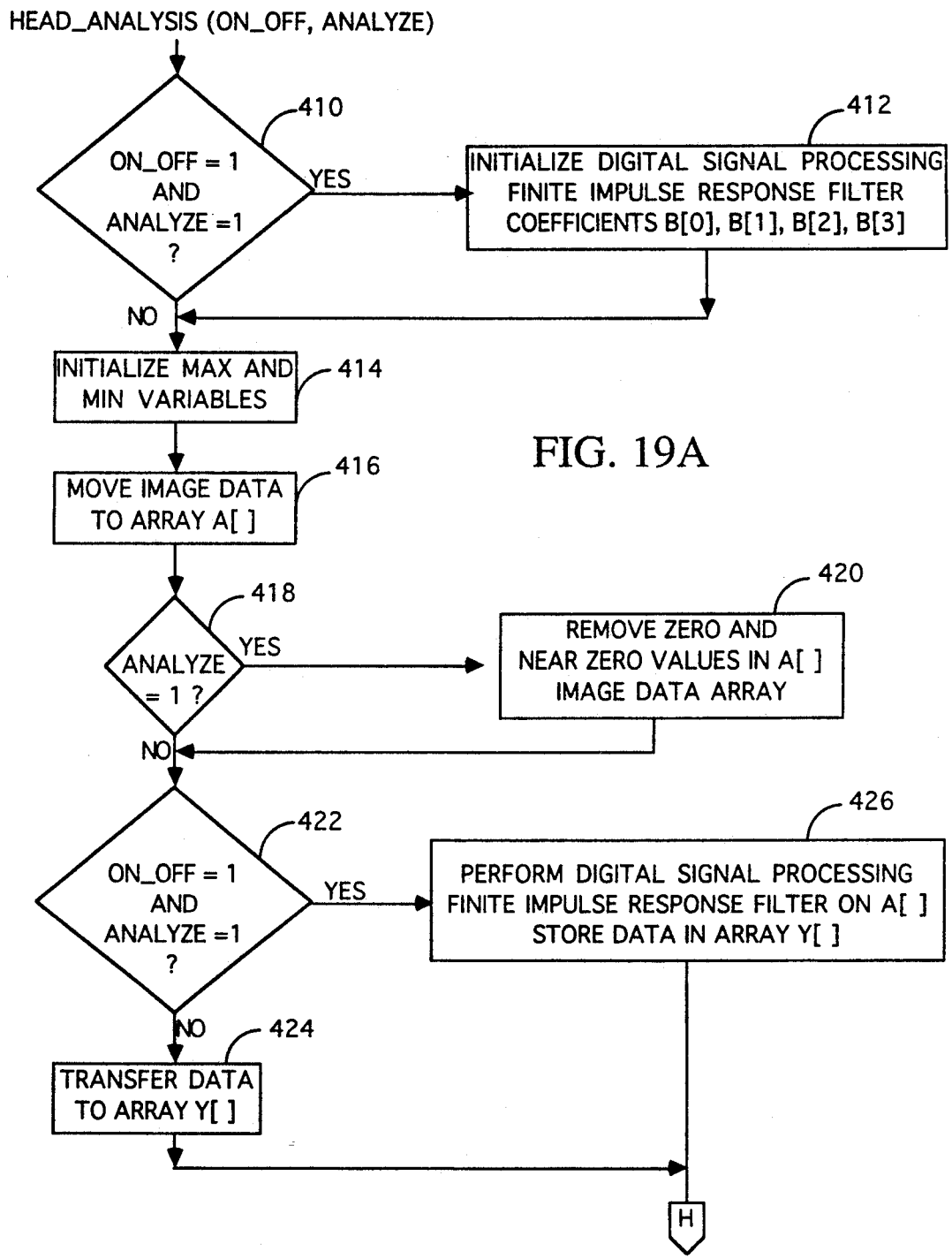
FIGS. 19A-19C comprise a flow chart of the rivet head analysis process steps employed by the present invention.
Figure 19B:
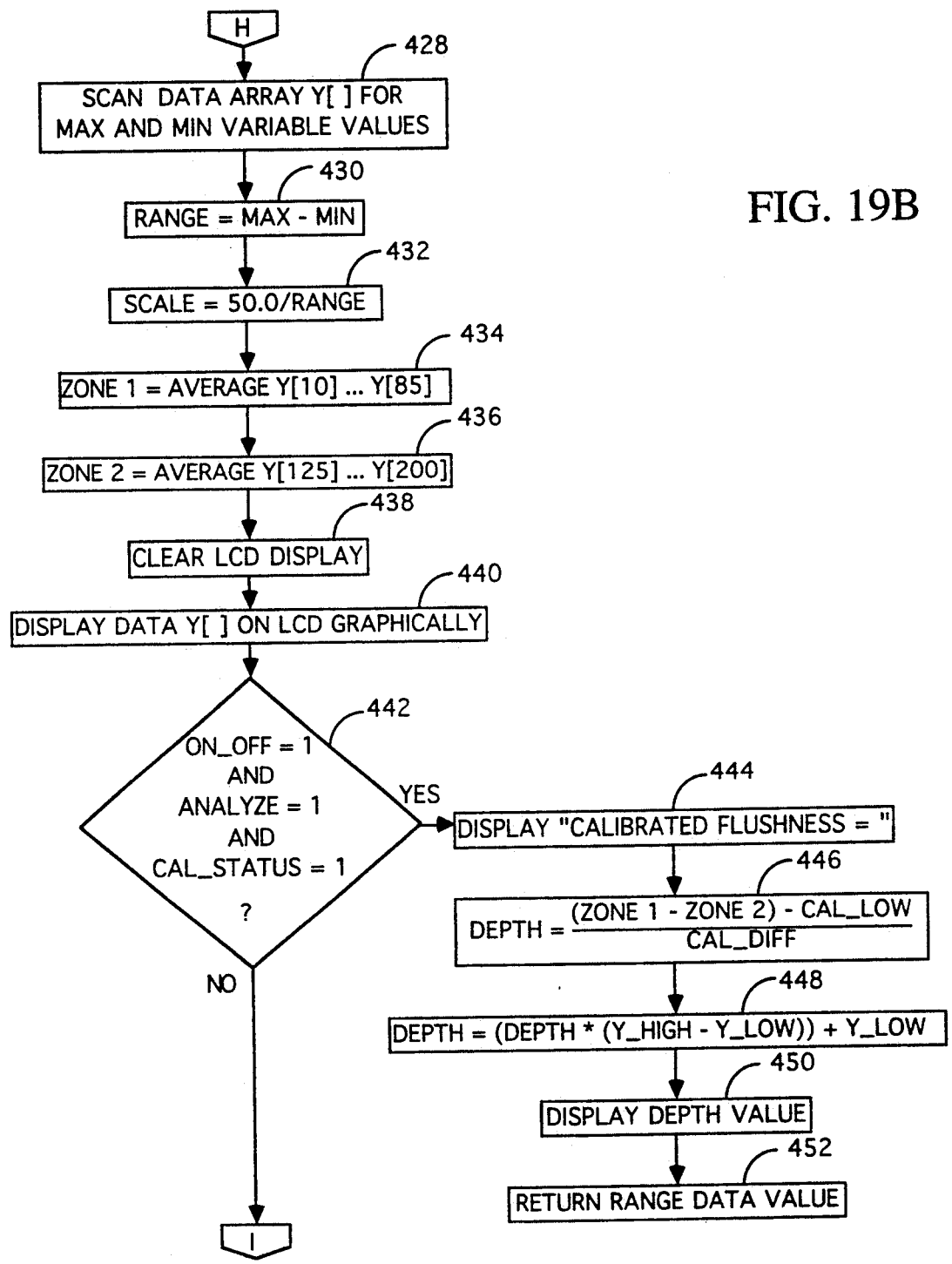
Figure 19C:
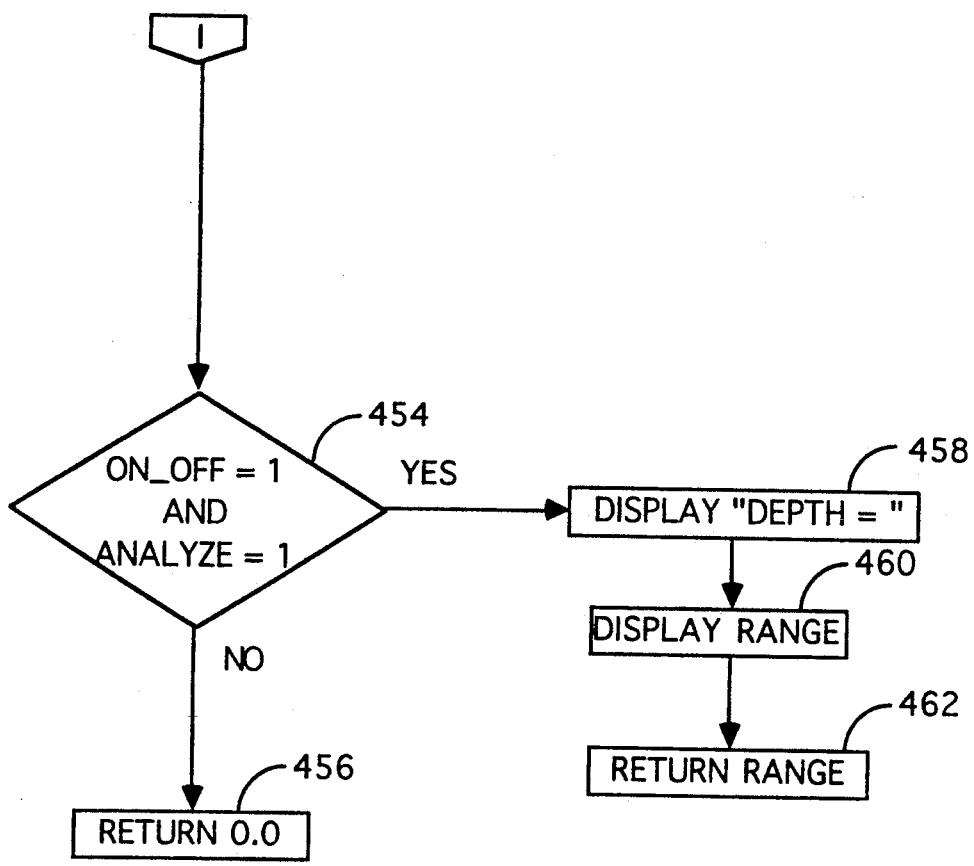

FIGS. 19A through 19C taken together comprise a flow chart of the HEAD_ANALYSIS steps performed by the present invention. The routine has two arguments, ON_OFF and ANALYZE. Referring now to FIG. 19A, the analysis begins with decision block 410 wherein a determination is undertaken as to whether ON_OFF and ANALYZE are both equal to one. If the decision result is "yes", the digital signal processing finite impulse response filter coefficients are initialized in step 412. This step corresponds to the initialization step conducted in FIG. 15A at step 224. The coefficients in the illustrated embodiment are chosen as follows: B[0]=0.0073, B[1]=0.0298, B[2]=0.0885, and B[3]=0.1418.

Once the coefficients have been initialized, processing proceeds at step 414. If decision block 410 determines that either one of ON_OFF or ANALYZE is not equal to one, processing follows directly at step 414 wherein the MAX and MIN variables are initialized, and then the image data acquired by the vision system is moved to an image data array A[] (step 416). Next, a determination is made as to whether the ANALYZE parameter is equal to one (decision block 418). If ANALYZE is one, the "remove zero and near-zero values in image data array" step 420 is performed which corresponds to the steps in FIGS. 20A through 20C, described hereinabove. After step 420 is completed, or if in decision block 418, ANALYZE is not equal to one, decision block 422 is entered wherein a determination is made as to whether ON_OFF equals one and ANALYZE equals one. If not, the image data is transferred to an output array Y[] (step 424) and processing is then indicated via off-page connector H of FIG. 19B.

However, if the result of decision block 422 is "yes", the "perform digital signal processing finite impulse response filter" routine is performed and the resultant filtered data is stored in array Y[] (block 426). The filter routine of block 426 corresponds to the filtering steps described in conjunction with FIG. 16 hereinabove. After step 426, program flow is indicated by means of off-page connector H of FIG. 19B.

Referring now to FIG. 19B, off-page connector H begins at step 428 wherein the data array Y[] is scanned to determine the maximum (MAX) and minimum (MIN) variable values, followed by step 430 wherein the variable RANGE is computed to be MAX minus MIN. Next, a variable SCALE is computed in step 432 wherein SCALE equals 50.0 divided by RANGE. Once SCALE has been computed, a variable ZONE1 is computed to be equal to the average of the data contained in the array positions Y[10] through Y[85] (step 434). This image data corresponds to the area ZONE1 of FIG. 18, the relatively flat sheet metal portion. Following step 434, a variable ZONE2 is computed in step 436 wherein ZONE2 is equal to the average of the data in array positions Y[125] through Y[200]. These data values correspond with the rivet head area ZONE2 illustrated in FIG. 18. It will, therefore, be appreciated that the data values stored in the array Y[86] through Y[124] correspond to the data gathered in the gap region of the rivet/sheet metal interaction zone, illustrated at ZONE3 in FIG. 18 herein. This ZONE3 information is not used, thereby preventing the gap from producing an erroneous rivet head height calculation. Once step 436 is completed, the LCD display 22 of FIG. 1 is cleared (step 438) and the data in the array Y[] is displayed graphically, producing a graphic representation of the scanned sheet metal, rivet head and gap area (step 440). Decision block 442 now determines whether ON_OFF, ANALYZE and CAL_STATUS are all equal to one. If the determination generates a "no" answer, processing steps at off-page connector I are next conducted (FIG. 19C). However, if all three of ON_OFF, ANALYZE and CAL_STATUS are equal to one, step 444 displays the message "CALIBRATED FLUSHNESS=" on the LCD, followed by step 446 wherein DEPTH is computed as follows:

$$DEPTH = \frac{(ZONE1 - ZONE2) - CAL\_LOW}{CAL\_DIFF}$$

Next, the final value of DEPTH is computed (step 448) according to the following formula:

DEPTH=DEPTH *
        (Y_HIGH—Y_LOW)+Y_LOW

The computed DEPTH value is displayed on the LCD (step 450), which supplies an indication of the head height (or flushness) of the rivet. Finally, the computed RANGE value (step 430) is returned at step 452.

Referring now to FIG. 19C, the steps at off-page connector I (which are reached if the result of decision block 442 is "no"), begin with decision block 454 wherein a determination is made as to whether ON_OFF and ANALYZE are both one. If the determination results in a "no" answer, the value 0.0 is returned (step 456), ending the HEAD_ANALYSIS routine. If, however, ON_OFF and ANALYZE are both equal to one, then the message "DEPTH=" is shown on the LCD (step 458) followed by the previously computed range value (step 460) and the range value is returned at step 462, completing the HEAD_ANALYSIS routine. Once the HEAD_ANALYSIS routine exits at either steps 452, 462 or 456, the program goes to decision block 186 as described in conjunction with FIG. 13C hereinabove.

An advantageous application of the measurement system of the present invention is in the chemical milling of parts. The system may be employed in the work area where the milling is being accomplished, to enable accurate determination of milled depth, reducing the likelihood of over depth or under depth milling.

A scratch measurement system has been shown and described together with an alternate embodiment for measuring rivet head height or flushness. The system is advantageously portable and easily used, with minimum controls and without complex operations, resulting in simple user training. Further, the device is certifiable to a calibration standard and employs a class I or class II laser, removing hazardous conditions which would be attendant with class III lasers.

It will be appreciated that the invention is not restricted to the particular embodiments that have been described, and that variations may be made therein without departing from the scope of the invention as defined in the appended claims.

I claim:

1. Apparatus for measuring depth profiles of a surface comprising:
    a measurement probe, said measurement probe including a line of light source for projecting a line of light on the surface, magnification means for magnifying the image of said line of light on said surface, and vision means for viewing said magnified image;
    signal processing means, said signal processing means including means for digitizing the image perceived by said viewing means and means for calculating depth parameters of said surface from said digitized image; and
    means for reported information about said surface comprising said depth parameters.

2. Apparatus according to claim 1 wherein said viewing means is positioned at an angle relative to the projection plane of said line of light for observing a profile of said line of light.

3. Apparatus according to claim 1 wherein said means for reporting information comprises an indicator for reporting whether said information is within a predetermined tolerance.

4. Apparatus for measuring depth profiles of a surface comprising:
    a measurement probe, said measurement probe including a line of light source for projecting a line of light on the surface, magnification means for magnifying the image of said line of light on said surface, and vision means for viewing said magnified image;
    signal processing means, said signal processing means including means for digitizing the image perceived by said viewing means and means for calculating depth parameters of said surface from said digitized image; and
    means for reporting information about said surface comprising said depth parameters,
    wherein said line of light source comprises
        a laser for generating a point light source, and
        a lens for receiving said point light source and for converting said point light source into a line of light projected onto the surface.

5. Apparatus according to claim 4 wherein said laser comprises a class I laser.

6. Apparatus according to claim 4 wherein said laser comprises a class II laser.

7. Apparatus for measuring depth profiles of a surface comprising:
    a measurement probe, said measurement probe including a line of light source for projecting a line of light on the surface, magnification means for magnifying the image of said line of light on said surface, and vision means for viewing said magnified image;
    signal processing means, said signal processing means including means for digitizing the image perceived by said viewing mean and means for calculating depth parameters of said surface from said digitized image; and
    means for reporting information about said surface comprising said depth parameters,
    wherein said means for digitizing said image comprises means for detecting an edge within said image and means for storing the location of said detected edge.

8. Apparatus for measuring depth profiles of a surface comprising:
    a measurement probe, said measurement probe including a line of light source for projecting a line of light on the surface, magnification means for magnifying the image of said line of light on said surface, and vision means for viewing said magnified image;
    signal processing means, said signal processing means including means for digitizing the image perceived by said viewing means and means for calculating depth parameters of said surface from said digitized image; and
    means for reporting information about said surface comprising said depth parameters;
    wherein said line of light source is adapted to project said line of light in a substantially orthogonal manner relative to the surface.

9. A method for determining the depth of a first surface relative to a second surface comprising the steps of:
    projecting a line of light on said first and second surfaces;
    viewing said line of light as projected on said first surface and said second surface at a predetermined angle relative to the line of light for observing a profile of said line of light and producing an image of said line of light, said image comprising a plurality of scan lines;

for ones of said plurality of scan lines of said image, processing said scan lines to determine the position within said ones of said scan lines where the gray scale value of said image exceeds a predetermined threshold value and saving position values representative of the positions within said ones of said scan lines where the gray scale value of said image exceeds said predetermined threshold value for said ones of said scan lines; and determining the depth of said first surface relative to said second surface based on said position values.

10. The method according to claim 9 further comprising the step of providing a report representative of the shape of said first and second surfaces.

11. The method according to claim 9 further comprising the step of performing signal processing on said position values to remote inconsistent data values.

12. The method according to claim 9 further comprising the step of filtering said position values to reduce high frequency components.

13. The method according to claim 9 wherein said step of viewing said line of light at a predetermined angle relative to the line of light for producing an image includes viewing said line of light with a video camera.

14. The method according to claim 9 wherein said step of viewing said line of light includes the step of magnifying the view.

15. The method according to claim 9 wherein said predetermined angle relative to the line of light is approximately 45 degrees.

16. The method according to claim 9 further comprising the step of indicating whether the determined depth of said first surface relative to said second surface is within a predetermined tolerance.

17. A method for determining the depth of a first surface relative to a second surface comprising the steps of:

providing said first and second surfaces with a diffuse coating to enhance the quality of the image;

projecting a line of light on said first and second surfaces;

viewing said line of light at a predetermined angle relative to the line of light for observing a profile of said line of light and producing an image of said line of light, said image comprising a plurality of scan lines;

for ones of said plurality of scan lines of said image, processing said scan lines to determine the position within said ones of said scan lines where the gray scale value of said image exceeds a predetermined threshold value and saving position values representative of the positions within said ones of said scan lines where the gray scale value of said image exceeds said predetermined threshold value for said ones of said scan lines; and determining the depth of said first surface relative to said second surface based on said position values.

18. A method for determining the depth of a first surface relative to a second surface comprising the steps of:

projecting a line of light on said first and second surfaces;

viewing said line of light at a predetermined angle relative to the line of light for observing a profile of said line of light and producing an image of said line of light, said image comprising a plurality of scan lines;

for ones of said plurality of scan lines of said image, processing said scan lines to determine the position within said ones of said scan lines where the gray scale values of said image exceeds a predetermined threshold value and saving position values representative of the positions within said ones of said scan lines where the gray scale value of said image exceeds said predetermined threshold value for said ones of said scan lines; and determining the depth of said first surface relative to said second surface based on said position values, wherein said second surface is relatively planar and said first surface comprises a scratch in said second surface.

19. A method for determining the depth of a first surface relative to a second surface comprising the steps of:

projecting a line of light on said first and second surfaces;

viewing said line of light at a predetermined angle relative to the line of light for observing a profile of said line of light and producing an image of said line of light, said image comprising a plurality of scan lines;

for ones of said plurality of scan lines of said image, processing said scan lines to determine the position within said ones of said scan lines where the gray scale value of said image exceeds a predetermined threshold value and saving position values representative of the positions within said ones of said scan lines where the gray scale value of said image exceeds said predetermined threshold value for said ones of said scan lines; and determining the depth of said first surface relative to said second surface based on said position values, wherein said first surface comprising a fastener embedded in said second surface.

20. A method for determining the depth of a first surface relative to a second surface comprising the steps of:

projecting a line of light on said first and second surfaces;

viewing said line of light at a predetermined angle relative to the line of light for observing a profile of said line of light and producing an image of said line of light, said image comprising a plurality of scan lines;

for ones of said plurality of scan lines of said image, processing said scan lines to determine the position within said ones of said scan lines where the gray scale value of said image exceeds a predetermined threshold value and saving position values representative of the positions within said ones of said scan lines where the gray scale value of said image exceeds said predetermined threshold value for said ones of said scan lines; and determining the depth of said first surface relative to said second surface based on said position values, wherein said step of projecting a line of light on said first and second surfaces comprises projecting said line of light substantially orthogonal to at least one of said first and second surfaces.

21. A portable scratch measuring system for quantifying scratch depths relative to a surrounding surface comprising:

imaging means, said imaging means comprising:
a light source means for projecting a line of light onto the scratch and the surrounding surface;
viewing means for viewing the scratch and surrounding surface upon which said line of light is projected, said viewing means being positioned to view the scratch and the surrounding surface at a predetermined angle relative to said projected line of light;
means for determining scratch depth based on information from said imaging means, said depth determining means including:
threshold detection means for generating information indicative of points at which an image intensity threshold is surpassed;
storage means for retaining said information indicative of points at which the image intensity threshold is surpassed;
computing means for calculating the depth of the scratch based on said information indicative of said points; and
means for reporting results from said computing means.

22. Apparatus according to claim 21 wherein said viewing means for viewing the target upon which said line of light is projected comprises:
a magnification lens for enlarging the image of said scratch; and
a view camera disposed to view said scratch through said magnification lens, 23. Apparatus according to claim 21 wherein said line of light is projected substantially orthogonally onto the surface surrounding the scratch.

24. Apparatus according to claim 21 wherein said angle at which said viewing means is positioned relative to said line of light is on the order of 45 degrees.

25. Apparatus according to claim 21 wherein said means for reporting results from said computing means comprises an indicator for reporting whether said results are within a predetermined tolerance.

26. Apparatus according to claim 21 wherein said light source means comprises:
a laser for generating a point light source; and
a lens for receiving said point light source and for converting said point light source into a line of light directed onto the scratch.

27. Apparatus according to claim 26 wherein said laser comprises a class I laser.

28. Apparatus according to claim 26 wherein said laser comprises a class II laser.

29. A method for measuring the height of a fastener relative to a surface comprising the steps of:
projecting a line of light across the fastener and the surface;
acquiring an image of said projected line;
determining a first acquired image value from a first zone, said first zone comprising a first portion of said acquired image in the area of said surface;
determining a second acquired image value from a second zone, said second zone comprising a second portion of said acquired image in the area of said fastener;
discarding image data from a third zone, said third zone comprising a third portion of said acquired image from the area where said fastener and said surface engage; and
processing said first and second acquired image values from said first and second zones to determine relative fastener height.

30. The method according to claim 29 wherein said step of determining said first acquired image value comprises averaging the image over said first zone and wherein said step of determining said second acquired image value comprises averaging the image over said second zone.

31. The method according to claim 29 further comprising the step of indicating whether the determined relative fastener height is within a predetermined tolerance.

32. Apparatus for measuring depth profiles of a surface comprising:
a measurement probe, said measurement probe including a line of light source for projecting a line of light onto the surface and vision means for viewing the image of said line of light;
signal processing means including means for determining depth parameters of said surface from said image; and
means for reporting information about said surface comprising said depth parameters.

33. Apparatus according to claim 32 wherein said line of light source comprises:
a laser for generating a point light source; and
a lens for receiving said point light source and for converting said point light source into a line of light directed on the surface.

34. Apparatus according to claim 33 wherein said laser comprises a class I laser.

35. Apparatus according to claim 33 wherein said laser comprises a class II laser.

36. Apparatus according to claim 33 wherein said viewing means is positioned at an angle relative to the projection plane of said line of light.

37. Apparatus for measuring depth profiles of a surface comprising:
a measurement probe, said measurement probe including a line of light source for projecting a line of light onto the surface and vision means for viewing the image of said line of light;
signal processing means including means for determining depth parameters of said surface from said image; and
means for reporting information about said surface comprising said depth parameters,
wherein said line of light source comprises
a laser for generating a point light source, and
a lens for receiving said point light source and for converting said point light source into a line of light directed onto the surface and,
wherein said line of light source is adapted to project said line of light in a substantially orthogonal manner relative to the surface.

38. A method for determining the depth profile of a surface comprising the steps of:
projecting a line of light onto said surface;
viewing said line of light at a predetermined angle relative to the projection plane of the line of light for observing a profile of said line of light and producing an image of said line of light;
processing said image to determine the positions within said image where the value of said image has predetermined characteristics; and
determining the depth of said surface based on said positions.

39. A method for determining the depth profile of a surface comprising the steps of:

projecting a line of light onto said surface;

viewing said line of light at a predetermined angle relative to the projection plane of the line of light for observing a profile of said line of light and producing an image of said line of light;

processing said image to determine the positions within said image where the value of said image has predetermined characteristics; and determining the depth of said surface based on said positions, wherein said surface carries a scratch and said step of projecting a line of light comprises projecting the line of light across the scratch.

40. The method according to claim 39 wherein the step of processing said image to determine positions within said image includes raster scanning said image across the projected line of light.

41. Apparatus for determining the depth of a first surface relative to a second surface comprising:

means for projecting a line of light on said first and second surfaces;

means for viewing said line of light at a predetermined angle relative to the projection plane of the line of light for observing a profile of said line of light and producing an image of said line of light;

means for processing said image to determine the positions within said image where the value of said image has predetermined characteristics; and means for determining the depth of said first surface relative to said second surface based on said positions.

* * * * *